US009774537B2

(12) United States Patent
Jain et al.

(10) Patent No.: US 9,774,537 B2
(45) Date of Patent: Sep. 26, 2017

(54) DYNAMICALLY ADJUSTING LOAD BALANCING

(71) Applicant: Nicira, Inc., Palo Alto, CA (US)

(72) Inventors: Jayant Jain, Cupertino, CA (US);
Anirban Sengupta, Saratoga, CA (US);
Mohan Parthasarathy, Cupertino, CA (US); Allwyn Sequeira, Saratoga, CA (US); Serge Maskalik, San Jose, CA (US); Rick Lund, Livermore, CA (US)

(73) Assignee: NICIRA, INC., Palo Alto, CA (US)

( * ) Notice: Subject to any disclaimer, the term of this patent is extended or adjusted under 35 U.S.C. 154(b) by 71 days.

(21) Appl. No.: 14/557,295

(22) Filed: Dec. 1, 2014

(65) Prior Publication Data
US 2016/0094643 A1  Mar. 31, 2016

Related U.S. Application Data

(60) Provisional application No. 62/058,044, filed on Sep. 30, 2014, provisional application No. 62/083,453, filed on Nov. 24, 2014.

(51) Int. Cl.
*H04L 12/803* (2013.01)
*H04L 29/08* (2006.01)
(Continued)

(52) U.S. Cl.
CPC ............ *H04L 47/125* (2013.01); *H04L 45/24* (2013.01); *H04L 45/44* (2013.01); *H04L 47/70* (2013.01);
(Continued)

(58) Field of Classification Search
None
See application file for complete search history.

(56) References Cited

U.S. PATENT DOCUMENTS 6,104,700 A   8/2000  Haddock et al.
6,880,089 B1  4/2005  Bommareddy et al.
(Continued)

FOREIGN PATENT DOCUMENTS

JP   2005-311863   11/2005
WO  WO 99/18534    4/1999
(Continued)

OTHER PUBLICATIONS

Invitation to Pay Additional Fees for PCT/US2014/072897, May 29, 2015 (mailing date), Nicira, Inc.
(Continued)

*Primary Examiner* — Ninos Donabed
(74) *Attorney, Agent, or Firm* — Adeli LLP

(57) ABSTRACT

Some embodiments provide a novel method for load balancing data messages that are sent by a source compute node (SCN) to one or more different groups of destination compute nodes (DCNs). In some embodiments, the method deploys a load balancer in the source compute node's egress datapath. This load balancer receives each data message sent from the source compute node, and determines whether the data message is addressed to one of the DCN groups for which the load balancer spreads the data traffic to balance the load across (e.g., data traffic directed to) the DCNs in the group. When the received data message is not addressed to one of the load balanced DCN groups, the load balancer forwards the received data message to its addressed destination. On the other hand, when the received data message is addressed to one of load balancer's DCN groups, the load balancer identifies a DCN in the addressed DCN group that should receive the data message, and directs the data message to the identified DCN. To direct the data message to the identified DCN, the load balancer in some embodiments changes the destination address (e.g., the destination IP (Continued)

address, destination port, destination MAC address, etc.) in the data message from the address of the identified DCN group to the address (e.g., the destination IP address) of the identified DCN.

15 Claims, 20 Drawing Sheets

(51) Int. Cl.
*H04L 12/721* (2013.01)
*H04L 12/911* (2013.01)
*H04L 12/707* (2013.01)
*H04L 29/12* (2006.01)

(52) U.S. Cl.
CPC ...... *H04L 67/1002* (2013.01); *H04L 67/1017* (2013.01); *H04L 67/1025* (2013.01); *H04L 67/1029* (2013.01); *H04L 61/2069* (2013.01); *H04L 61/2521* (2013.01); *H04L 61/6022* (2013.01)

(56) References Cited

U.S. PATENT DOCUMENTS

| | | | |
|---|---|---|---|
| 7,013,389 B1 | 3/2006 | Srivastava et al. | |
| 7,480,737 B2 | 1/2009 | Chauffour et al. | |
| 7,818,452 B2 | 10/2010 | Matthews et al. | |
| 7,898,959 B1 * | 3/2011 | Arad | H04L 45/00 370/235 |
| 7,948,986 B1 | 5/2011 | Ghosh et al. | |
| 8,078,903 B1 | 12/2011 | Parthasarathy et al. | |
| 8,190,767 B1 | 5/2012 | Maufer et al. | |
| 8,266,261 B2 | 9/2012 | Akagi | |
| 8,521,879 B1 | 8/2013 | Pena et al. | |
| 8,873,399 B2 | 10/2014 | Bothos et al. | |
| 8,914,406 B1 * | 12/2014 | Haugsnes | H04L 63/1441 382/305 |
| 9,148,367 B2 | 9/2015 | Kandaswamy et al. | |
| 9,191,293 B2 | 11/2015 | Iovene et al. | |
| 9,264,313 B1 | 2/2016 | Manuguri et al. | |
| 9,277,412 B2 | 3/2016 | Freda et al. | |
| 9,397,946 B1 | 7/2016 | Yadav | |
| 2003/0093481 A1 | 5/2003 | Mitchell et al. | |
| 2005/0091396 A1 * | 4/2005 | Nilakantan | H04L 45/04 709/232 |
| 2005/0114429 A1 | 5/2005 | Caccavale | |
| 2005/0132030 A1 | 6/2005 | Hopen et al. | |
| 2005/0249199 A1 * | 11/2005 | Albert | H04L 67/1002 370/352 |
| 2006/0069776 A1 * | 3/2006 | Shim | H04L 67/1008 709/225 |
| 2006/0130133 A1 | 6/2006 | Andreev et al. | |
| 2006/0155862 A1 * | 7/2006 | Kathi | H04L 45/38 709/229 |
| 2006/0233155 A1 | 10/2006 | Srivastava | |
| 2007/0061492 A1 | 3/2007 | van Riel | |
| 2007/0214282 A1 | 9/2007 | Sen | |
| 2008/0005293 A1 | 1/2008 | Bhargava et al. | |
| 2008/0031263 A1 | 2/2008 | Ervin et al. | |
| 2008/0046400 A1 | 2/2008 | Shi et al. | |
| 2008/0049614 A1 | 2/2008 | Briscoe et al. | |
| 2008/0049786 A1 | 2/2008 | Ram et al. | |
| 2008/0072305 A1 | 3/2008 | Casado et al. | |
| 2008/0084819 A1 * | 4/2008 | Parizhsky | H04L 47/10 370/230 |
| 2008/0104608 A1 | 5/2008 | Hyser et al. | |
| 2008/0195755 A1 * | 8/2008 | Lu | H04L 29/06 709/241 |
| 2008/0225714 A1 | 9/2008 | Denis | |
| 2008/0239991 A1 * | 10/2008 | Applegate | H04L 41/5009 370/254 |
| 2008/0247396 A1 | 10/2008 | Hazard | |
| 2008/0279196 A1 | 11/2008 | Friskney et al. | |
| 2009/0063706 A1 | 3/2009 | Goldman et al. | |
| 2009/0129271 A1 | 5/2009 | Ramankutty et al. | |
| 2009/0172666 A1 | 7/2009 | Yahalom et al. | |
| 2009/0235325 A1 | 9/2009 | Dimitrakos et al. | |
| 2009/0265467 A1 * | 10/2009 | Peles | H04L 47/10 709/226 |
| 2009/0299791 A1 * | 12/2009 | Blake | G06Q 10/06 705/40 |
| 2009/0300210 A1 | 12/2009 | Ferris | |
| 2009/0303880 A1 | 12/2009 | Maltz et al. | |
| 2009/0307334 A1 | 12/2009 | Maltz et al. | |
| 2009/0327464 A1 | 12/2009 | Archer et al. | |
| 2010/0031360 A1 | 2/2010 | Seshadri et al. | |
| 2010/0036903 A1 | 2/2010 | Ahmad et al. | |
| 2010/0131638 A1 | 5/2010 | Kondamuru | |
| 2010/0223364 A1 * | 9/2010 | Wei | H04L 29/04 709/220 |
| 2010/0223621 A1 | 9/2010 | Joshi et al. | |
| 2010/0265824 A1 | 10/2010 | Chao et al. | |
| 2011/0010578 A1 | 1/2011 | Dominguez et al. | |
| 2011/0016348 A1 | 1/2011 | Pace et al. | |
| 2011/0022695 A1 | 1/2011 | Dalal et al. | |
| 2011/0022812 A1 | 1/2011 | van der Linden et al. | |
| 2011/0040893 A1 * | 2/2011 | Karaoguz | H04L 67/2847 709/242 |
| 2011/0055845 A1 | 3/2011 | Nandagopal et al. | |
| 2011/0090912 A1 | 4/2011 | Shippy | |
| 2011/0164504 A1 | 7/2011 | Bothos et al. | |
| 2011/0211463 A1 * | 9/2011 | Matityahu | H04L 43/028 370/252 |
| 2011/0225293 A1 | 9/2011 | Rathod | |
| 2011/0235508 A1 | 9/2011 | Goel et al. | |
| 2011/0261811 A1 | 10/2011 | Battestilli et al. | |
| 2011/0268118 A1 | 11/2011 | Schlansker et al. | |
| 2011/0283013 A1 | 11/2011 | Grosser et al. | |
| 2011/0295991 A1 | 12/2011 | Aida | |
| 2012/0014386 A1 | 1/2012 | Xiong et al. | |
| 2012/0023231 A1 | 1/2012 | Ueno | |
| 2012/0054266 A1 | 3/2012 | Kazerani et al. | |
| 2012/0089664 A1 | 4/2012 | Igelka | |
| 2012/0137004 A1 | 5/2012 | Smith | |
| 2012/0144014 A1 | 6/2012 | Natham et al. | |
| 2012/0147894 A1 | 6/2012 | Mulligan et al. | |
| 2012/0155266 A1 | 6/2012 | Patel et al. | |
| 2012/0185588 A1 * | 7/2012 | Error | G06Q 30/02 709/224 |
| 2012/0207174 A1 | 8/2012 | Shieh | |
| 2012/0230187 A1 | 9/2012 | Tremblay et al. | |
| 2012/0246637 A1 | 9/2012 | Kreeger et al. | |
| 2012/0287789 A1 | 11/2012 | Aybay et al. | |
| 2012/0303809 A1 | 11/2012 | Patel et al. | |
| 2012/0331188 A1 * | 12/2012 | Riordan | G06F 3/061 710/33 |
| 2013/0003735 A1 * | 1/2013 | Chao | H04L 45/66 370/392 |
| 2013/0044636 A1 | 2/2013 | Koponen et al. | |
| 2013/0073743 A1 | 3/2013 | Ramasamy et al. | |
| 2013/0136126 A1 | 5/2013 | Wang et al. | |
| 2013/0148505 A1 | 6/2013 | Koponen et al. | |
| 2013/0163594 A1 | 6/2013 | Sharma et al. | |
| 2013/0201989 A1 | 8/2013 | Hu et al. | |
| 2013/0227097 A1 | 8/2013 | Yasuda et al. | |
| 2013/0227550 A1 | 8/2013 | Weinstein et al. | |
| 2013/0332983 A1 | 12/2013 | Koorevaar et al. | |
| 2014/0059204 A1 | 2/2014 | Nguyen et al. | |
| 2014/0059544 A1 | 2/2014 | Koganty et al. | |
| 2014/0068602 A1 | 3/2014 | Gember et al. | |
| 2014/0092738 A1 * | 4/2014 | Grandhi | H04L 47/52 370/235 |
| 2014/0101226 A1 * | 4/2014 | Khandekar | H04L 67/1008 709/203 |
| 2014/0115578 A1 | 4/2014 | Cooper et al. | |
| 2014/0164477 A1 | 6/2014 | Springer et al. | |
| 2014/0195666 A1 | 7/2014 | Dumitriu et al. | |
| 2014/0207968 A1 | 7/2014 | Kumar et al. | |
| 2014/0254374 A1 | 9/2014 | Janakiraman et al. | |
| 2014/0281029 A1 | 9/2014 | Danforth | |
| 2014/0282526 A1 | 9/2014 | Basavaiah et al. | |

(56) References Cited

U.S. PATENT DOCUMENTS

| | | | |
|---|---|---|---|
| 2014/0301388 A1 | 10/2014 | Jagadish et al. | |
| 2014/0304231 A1 | 10/2014 | Kamath et al. | |
| 2014/0310391 A1 | 10/2014 | Sorenson, III et al. | |
| 2014/0310418 A1 | 10/2014 | Sorenson, III et al. | |
| 2014/0330983 A1 | 11/2014 | Zisapel et al. | |
| 2014/0362705 A1* | 12/2014 | Pan | H04L 47/125 370/237 |
| 2014/0369204 A1 | 12/2014 | Anand et al. | |
| 2014/0372567 A1 | 12/2014 | Ganesh et al. | |
| 2014/0372616 A1 | 12/2014 | Arisoylu et al. | |
| 2014/0372702 A1 | 12/2014 | Subramanyam et al. | |
| 2015/0003453 A1 | 1/2015 | Sengupta et al. | |
| 2015/0026345 A1 | 1/2015 | Ravinoothala et al. | |
| 2015/0030024 A1 | 1/2015 | Venkataswami et al. | |
| 2015/0052262 A1 | 2/2015 | Chanda et al. | |
| 2015/0063364 A1 | 3/2015 | Thakkar et al. | |
| 2015/0215819 A1 | 7/2015 | Bosch et al. | |
| 2015/0280959 A1 | 10/2015 | Vincent | |
| 2015/0281089 A1 | 10/2015 | Marchetti | |
| 2015/0288679 A1 | 10/2015 | Ben-Nun et al. | |
| 2015/0372911 A1 | 12/2015 | Yabusaki et al. | |
| 2016/0043901 A1 | 2/2016 | Sankar et al. | |
| 2016/0094451 A1 | 3/2016 | Jain et al. | |
| 2016/0094452 A1 | 3/2016 | Jain et al. | |
| 2016/0094631 A1 | 3/2016 | Jain et al. | |
| 2016/0094642 A1 | 3/2016 | Jain et al. | |
| 2016/0149816 A1 | 5/2016 | Wu et al. | |
| 2016/0164787 A1 | 6/2016 | Roach et al. | |
| 2017/0142012 A1 | 5/2017 | Thakkar et al. | |

FOREIGN PATENT DOCUMENTS

| | | |
|---|---|---|
| WO | WO 2008/095010 | 8/2008 |
| WO | PCT/US2014/072897 | 12/2014 |
| WO | WO 2016/053373 | 4/2016 |

OTHER PUBLICATIONS

International Search Report and Written Opinion of PCT/US2014/072897, Aug. 4, 2015 (mailing date), Nicira, Inc.

Author Unknown, "Enabling Service Chaining on Cisco Nexus 1000V Series," Month Unknown, 2012, 25 pages, Cisco.

Author Unknown. "AppLogic Features," Jul. 2007, 2 pages, 3TERA, Inc., available at http://web.archive.org/web/2000630051607/www.3tera.com/applogic-features.html.

Dixon, Colin, et al., "An End to the Middle," Proceedings of the 12th conference on Hot topics in operating systems USENIX Association, May 2009, pp. 1-5, Berkeley, CA, USA.

Dumitriu, Dan Mihai, et al. (U.S. Appl. No. 61/514,990), filed Aug. 4, 2011.

Greenberg, Albert, et al., "VL2: A Scalable and Flexible Data Center Network," SIGCOMM'09, Aug. 17-21, 2009, pp. 51-62, ACM, Barcelona, Spain.

Guichard, J., et al., "Network Service Chaining Problem Statement," Network Working Group, Jun. 13, 2013, 14 pages, Cisco Systems, Inc.

Joseph, Dilip, et al., "A Policy-aware Switching Layer for Date Centers," Jun. 24, 2008, 26 pages, Electrical Engineering and Computer Sciences, University of California, Berkeley, CA, USA.

Sekar, Vyas, et al., "Design and Implementation of a Consolidated Middlebox Architecture," 9$^{th}$ USENIX conference on Networked System Design and Implementation, Apr. 25-27, 2012, 14 pages.

Sherry, Justine, et al., "Making Middleboxes Someone Else's Problem: Network Processing as a Cloud Service," SSIGCOMM, Aug. 13-17, 2012, 12 pages, ACM, Helsinki, Finland.

Portions of prosecution history of U.S. Appl. No. 14/557,290, filed Jun. 16, 2016, Jain, Jayant, et al.

Portions of prosecution history of U.S. Appl. No. 14/557,293, filed Apr. 3, 2015, Jain, Jayant, et al.

\* cited by examiner

DYNAMICALLY ADJUSTING LOAD BALANCING

BACKGROUND

Load balancers are commonly used in datacenters to spread the traffic load to a number of available computing resources that can handle a particular type of traffic. FIGS. 1 and 2 illustrate two common deployments of load balancers in datacenters today. In FIG. 1, the load balancers 100 are topologically deployed at the edge of the network and between different types of VMs (e.g., between webservers 105 and application servers 110, and between application servers 110 and the database servers 115). The load balancers 100 are in some deployments standalone machines (e.g., F5 machines) that perform load balancing functions. Also, in some deployments, the load balancers are service virtual machines (VMs) that are executing on the same host computing devices that execute the different layers of servers that have their traffic balanced by the load balancers. FIG. 2 illustrates one such deployment of load balancers as service VMs (SVMs).

In the load balancer deployments of FIGS. 1 and 2, the load balancers serve as chokepoint locations in the network topology because they become network traffic bottlenecks as the traffic load increases. Also, these deployments require manual configuration of the load balancers and the computing devices that send data packets to these load balancers in order to allow the load balancers to properly receive and distribute the load balanced traffic. These deployments also do not seamlessly grow and shrink the number of the computing devices that receive the load balanced traffic, as the data traffic increases and decreases.

BRIEF SUMMARY

Some embodiments provide a novel method for load balancing data messages that are sent by a source compute node (SCN) to one or more different groups of destination compute nodes (DCNs). In some embodiments, the method deploys a load balancer in the source compute node's egress datapath. This load balancer receives each data message sent from the source compute node, and determines whether the data message is addressed to one of the DCN groups for which the load balancer spreads the data traffic to balance the load across (e.g., data traffic directed to) the DCNs in the group. When the received data message is not addressed to one of the load balanced DCN groups, the load balancer forwards the received data message to its addressed destination. On the other hand, when the received data message is addressed to one of load balancer's DCN groups, the load balancer identifies a DCN in the addressed DCN group that should receive the data message, and directs the data message to the identified DCN. To direct the data message to the identified DCN, the load balancer in some embodiments changes the destination address (e.g., the destination IP address, destination port, destination MAC address, etc.) in the data message from the address of the identified DCN group to the address (e.g., the destination IP address) of the identified DCN.

By employing this inline load-balancing (LB) method, a source compute node does not have to be configured to address certain data messages to load balancers while foregoing such addressing for other data messages. This method can also seamlessly perform load balancing for several different DCN groups. In some embodiments, the source compute node and DCN group(s) are within one compute cluster in a datacenter. Accordingly, the method of some embodiments can seamlessly load balance data messages that are sent to one or more DCN groups within a compute cluster from source compute nodes in the compute cluster.

In some embodiments, the source compute node is a virtual machine (VM) that executes on a host, and the load balancer is another software module that executes on the same host. Other VMs also execute on the host in some embodiments. Two or more of the VMs (e.g., all of the VMs) on the host use the same load balancer in some embodiments, while in other embodiments, each VM on the host has its own load balancer that executes on the host.

The host also executes a software forwarding element (SFE) in some embodiments. The SFE communicatively couples the VMs of the host to each other and to other devices (e.g., other VMs) outside of the host. In some embodiments, the load balancers are inserted in the egress path of the VMs before the SFE. For instance, in some embodiments, each VM has a virtual network interface card (VNIC) that connects to a port of the SFE. In some of these embodiments, the load balancer for a VM is called by the VM's VNIC or by the SFE port to which the VM's VNIC connects. In some embodiments, the VMs execute on top of a hypervisor, which is a software layer that enables the virtualization of the shared hardware resources of the host. In some of these embodiments, the hypervisor provides the load balancers that provide the inline load balancing service to its VMs.

The load balancing method of some embodiments is implemented in a datacenter that has several hosts executing several VMs and load balancers. In some of these embodiments, some or all of the load balanced DCNs are other VMs that are executing on the same or different hosts as the SCN VMs. Examples of source and destination compute nodes that can be load balanced by the load balancing method of some embodiments include data compute end nodes (i.e., source and data compute end nodes) that generate or consume data messages, or middlebox service nodes that perform some type of data processing on the data messages as these messages are being relayed between the data compute end nodes. Examples of data compute end nodes (DCEN) include webservers, application servers, database servers, etc., while example of middlebox service nodes include firewalls, intrusion detection systems, intrusion prevention systems, etc.

In a multi-host environment of some embodiments, the load balancers on the host implement a distributed load balancing (DLB) method. This DLB method of some embodiments involves deploying one or more load balancers on the hosts that execute the SCN VMs. The load balancers on the hosts enforce the load balancing rules needed to spread the data traffic from the SCN VMs on their hosts to the DCNs of one or more DCN groups. In this distributed implementation, each load balancer enforces just the load balancing rules that are applicable to its SCN VM or VMs.

A set of one or more controllers facilitate the DLB operations of some embodiments. For instance, in some embodiments, the load balancers on the hosts collect data traffic statistics based on the data messages that they load balance. These load balancers then pass the collected statistics to the controller set, which aggregates the statistics. In some embodiments, the controller set then distributes the aggregated statistics to load balancing agents that execute on the hosts. These agents then analyze the aggregated statistics to generate and/or to adjust load balancing criteria that the load balancers (that execute on the same hosts as the agents) enforce. In other embodiments, the controller set analyzes the aggregated statistics to generate and/or to adjust load balancing criteria, which the controller set then distributes to the hosts for their load balancers to enforce. In still other embodiments, the controller set generates and distributes some load balancing criteria based on the aggregated statistics, while also distributing some or all aggregated statistics to the hosts so that their LB agents can generate other load balancing criteria.

Irrespective of the implementation for generating the load balancing criteria, the collection and aggregation of the data traffic statistics allows the load balancing criteria to be dynamically adjusted. For instance, when the statistics show that one DCN is too congested with data traffic, the load balancing criteria can be adjusted dynamically to reduce the load on this DCN while increasing the load on one or more DCNs in the same DCN group. In some embodiments, the collection and aggregation of the data traffic statistics also allows the DLB method to reduce the load in any load balanced DCN group by dynamically instantiating or allocating new DCN VMs for the DCN group or by instantiating or allocating new SCN VMs.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
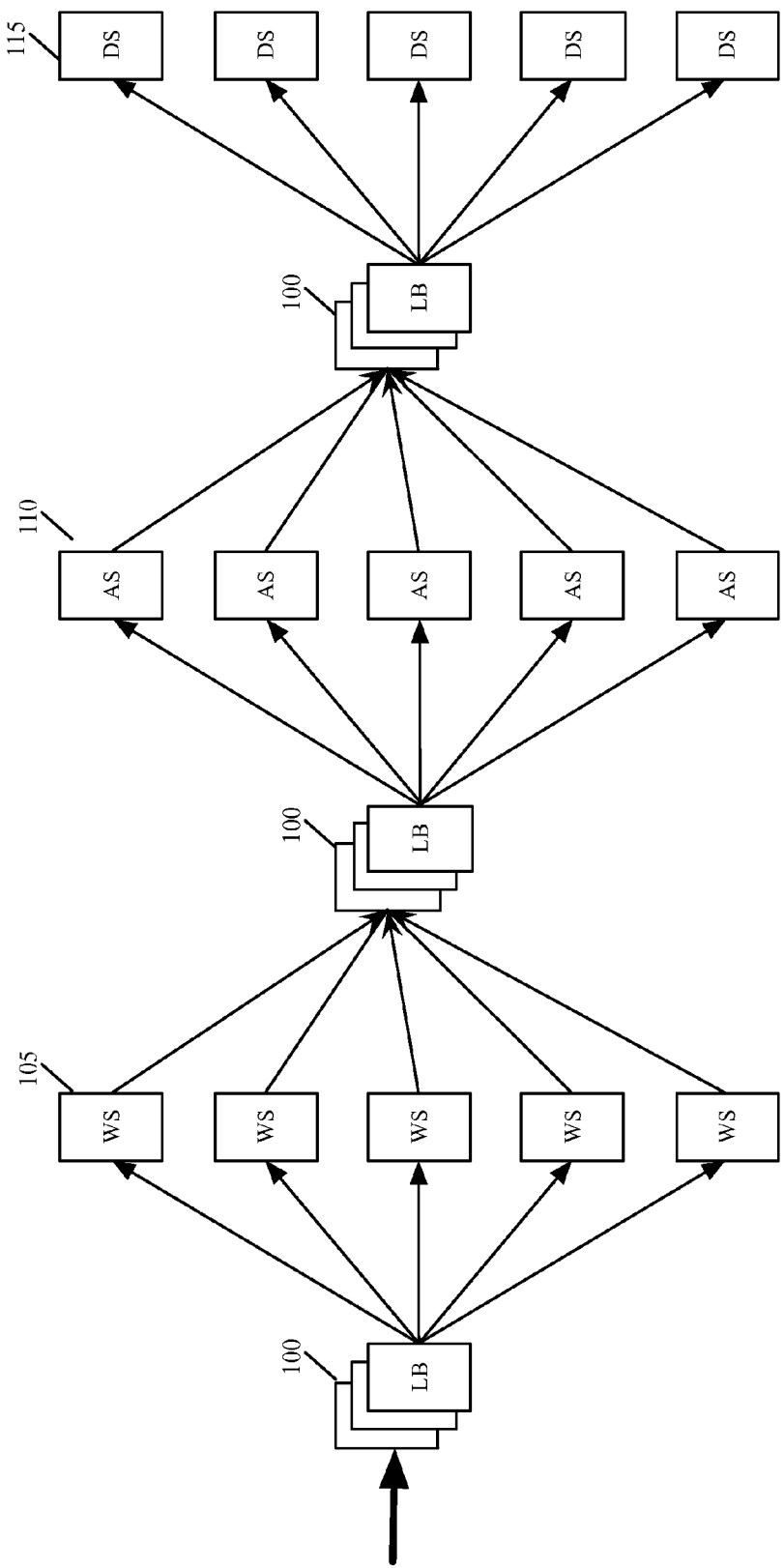
FIGS. 1 and 2 illustrate two common deployments of load balancers in datacenters today.
Figure 2:
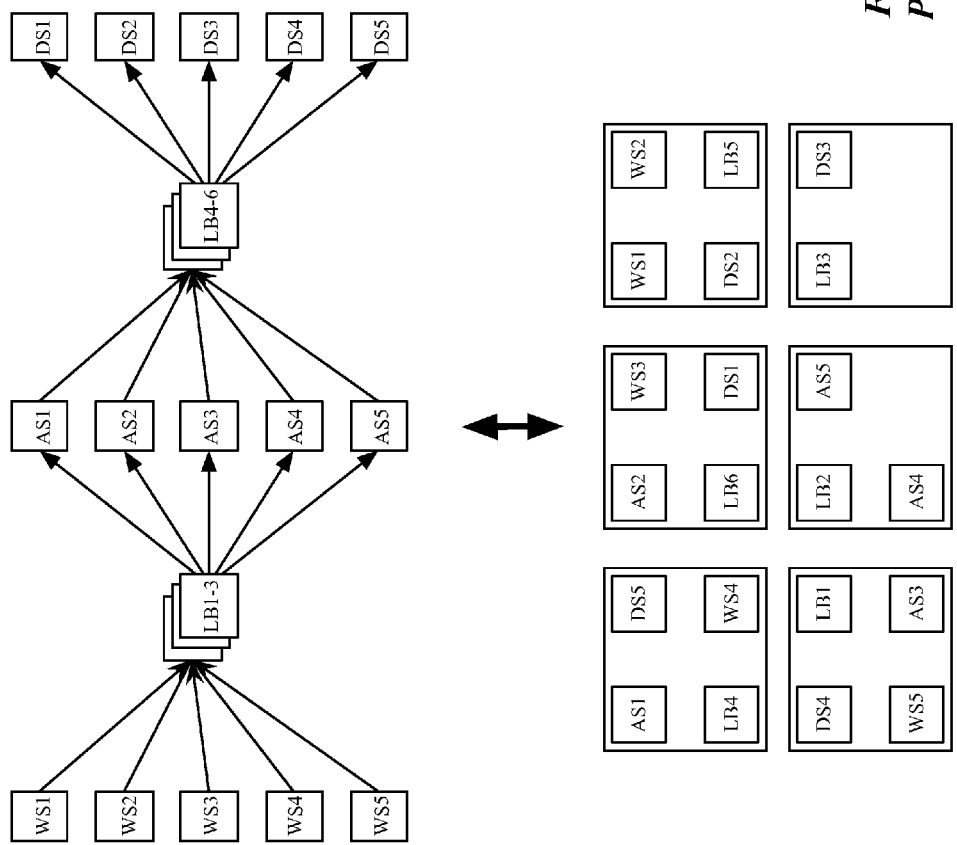

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for load balancing data messages that are sent by a source compute node (SCN) to one or more different groups of destination compute nodes (DCNs). In some embodiments, the method deploys a load balancer in the source compute node's egress datapath. This load balancer receives each data message sent from the source compute node, and determines whether the data message is addressed to one of the DCN groups for which the load balancer spreads the data traffic to balance the load across (e.g., data traffic directed to) the DCNs in the group. When the received data message is not addressed to one of the load balanced DCN groups, the load balancer forwards the received data message to its addressed destination. On the other hand, when the received data message is addressed to one of load balancer's DCN groups, the load balancer identifies a DCN in the addressed DCN group that should receive the data message, and directs the data message to the identified DCN. To direct the data message to the identified DCN, the load balancer in some embodiments changes the destination address (e.g., the destination IP address) in the data message from the address of the identified DCN group to the address (e.g., the destination IP address, destination port, destination MAC address, etc.) of the identified DCN.

Examples of source and destination compute nodes that can be load balanced by the method of some embodiments include data compute end nodes (i.e., source and data compute end nodes) that generate or consume data messages, or middlebox service nodes that perform some data processing on the data messages that are relayed between the data compute end nodes. Examples of data compute end nodes (DCEN) include webservers, application servers, database servers, etc., while example of middlebox service nodes include firewalls, intrusion detection systems, intrusion protection systems, etc. Also, as used in this document, a data message refers to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc.

By employing the inline load-balancing (LB) method of some embodiments, a source compute node does not have to be configured to address certain data messages to load balancers while foregoing such addressing for other data messages. In some embodiments, the service gets deployed for a SCN automatically when the SCN is deployed as a virtual machine on a host, and the VM deployment process configures the load balancing criteria for the VM. This method can also seamlessly perform load balancing for several different DCN groups. In some embodiments, the SCNs and the DCNs are within one compute cluster in a datacenter. Accordingly, the method of some embodiments can seamlessly load balance data messages that are sent to one or more DCN groups within a compute cluster from other source compute nodes in the compute cluster.

Figure 3:
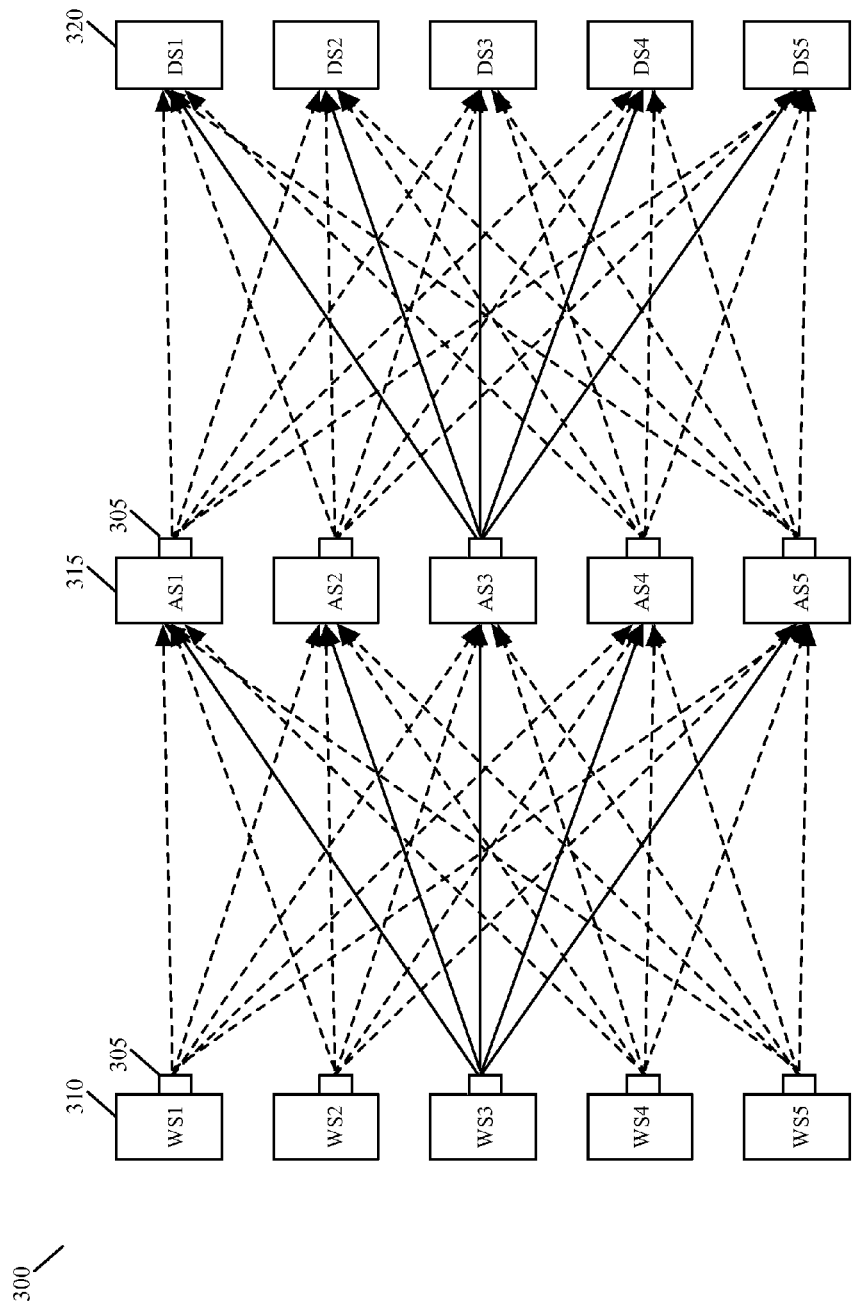
FIG. 3 illustrates a load balancing architecture that employs the inline load-balancing method of some embodiments.

FIG. 3 illustrates a load balancing architecture 300 that employs the inline load-balancing method of some embodiments. This architecture is a distributed load balancing (DLB) architecture that has a load balancer 305 in the egress datapath of each of several compute nodes. The compute nodes in this example fall into three groups of servers, which are web servers 310, application servers 315, and database servers 320. In some embodiments, the three groups of servers are three-tiers of servers that are commonly found in a datacenter.

As shown, a load balancer 305 is placed at the output of each web or application server in this example, so that webserver data traffic to the application servers is load balanced, and the application server data traffic to the database servers is load balanced. Each load balancer enforces the load balancing rules needed to spread the data traffic that is sent from the load balancer's corresponding source compute node (e.g., source servers) to multiple destination compute nodes (e.g., destination servers) that are part of one DCN group. In other words, this distributed implementation allows each load balancer to enforce just the load balancing rules that are applicable to its source compute node. Also, this distributed architecture does not have any load balancer that is a chokepoint as it receives too much data messages from one or more source compute nodes that prevent it from timely spreading the data messages from another source compute node.

Figure 4:
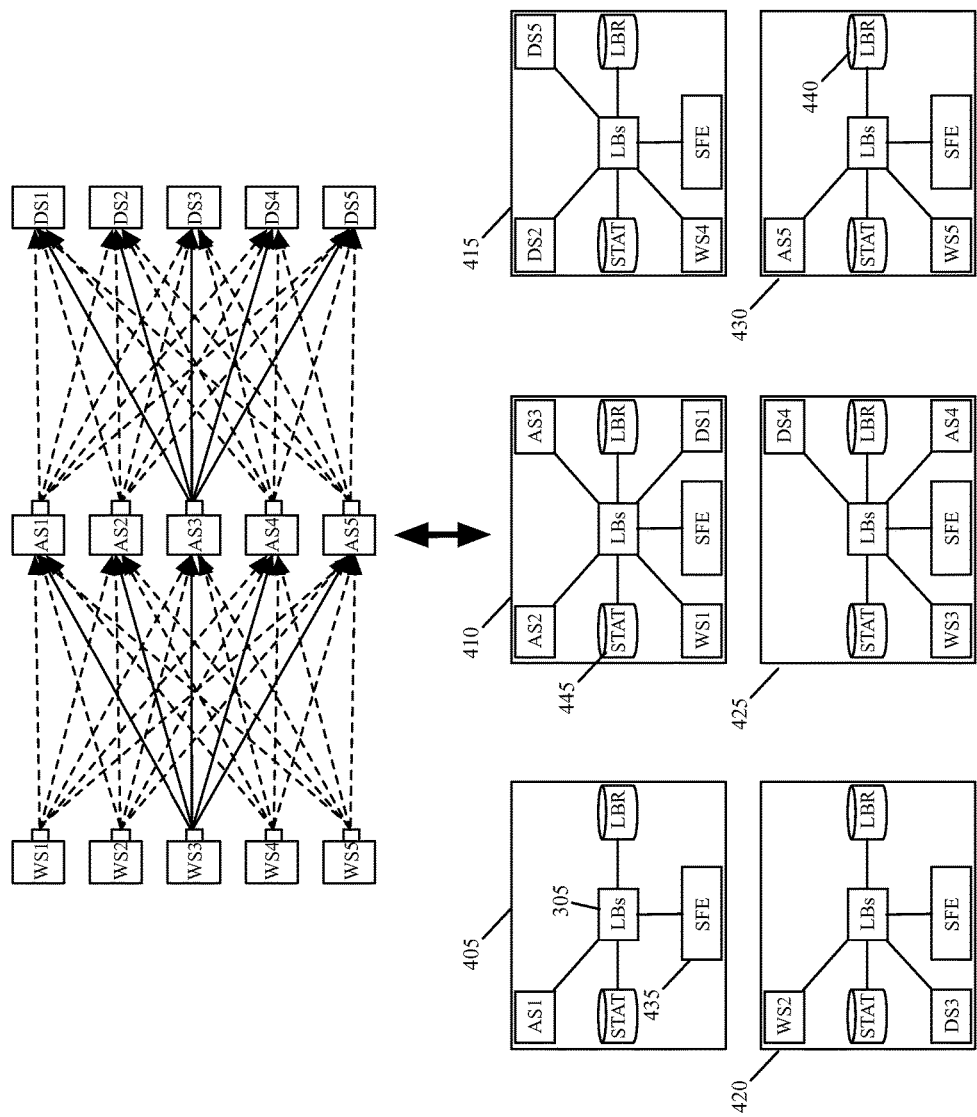
FIG. 4 illustrates an example of inline load balancers.

In some embodiments, some or all of the source and destination compute nodes are virtual machines (VMs) that executes on a host, and some or all of the load balancers are other software module that executes on the same hosts as their source compute nodes. FIG. 4 illustrates an example in which the load balancers 305 and the three groups of servers 310, 315, and 320 of FIG. 3 are executing on six hosts 405-430 in a datacenter. In the example illustrated in FIG. 4, one LB executes on each host for each web or application server that needs some of its data messages load balanced. In other embodiments, however, one load balancer on a host load balances the output data messages of two or more of the VMs (e.g., all of the VMs) on the host. Even under this architecture that uses one load balancer for two or more SCN VMs, the load balancers implement a DLB scheme as each load balancer enforces just the load balancing rules that are applicable to SCN VM or VMs on that host.

FIG. 4 illustrates that in addition to the VMs and load balancers that execute on the hosts, each host also executes a software forwarding element (SFE) 435 in some embodiments. The SFE 435 on a host communicatively couples the VMs of the host to each other and to other devices outside of the host (e.g., VMs on other hosts) through one or more other forwarding elements (e.g., one or more switches and routers) outside of the host. Examples of SFEs include software switches, software routers, etc.

As shown in FIG. 4, the load balancers in some embodiments are inserted in the egress path of the VMs before the SFE. For instance, in some embodiments, each VM has a virtual network interface card (VNIC) that connects to a port of the SFE. In some of these embodiments, the load balancer for a VM is called by the VNIC of the VM or by the SFE port to which the VM's VNIC connects. In some embodiments, the VMs execute on top of a hypervisor, which is a software layer that enables the virtualization of the shared hardware resources of the host. In some of these embodiments, the hypervisors provide the load balancers that provide the inline load balancing service to its VMs.

FIG. 4 also shows each host to have two data storages 440 and 445. The first data storage is an LB rule data storage 440 (e.g., database), while the second data storage is a STAT data storage 445. In some embodiments, the host's data storage 440 stores LB rules that specify the IP addresses of the DCN VMs of the DCN groups that are load balanced by the host's load balancers. In some embodiments, the LB rule storages 440 not only store the IP addresses of the DCN VMs but also stores the load balancing criteria (metrics) that the load balancers use to load balance the data traffic. While one LB rule storage 440 is shown for all load balancers 305 in FIG. 4, one of ordinary skill in the art will realize that in other embodiments each load balancer 305 has its own LB rule storage 440.

In some embodiments, a SCN VM sends a data message to a virtual address (e.g., a virtual IP (VIP) address) that is associated with a load balanced DCN group. Before this data message is processed by the SFE of the VM's host, the SCN VM's load balancer intercepts the data message and determines that it is addressed to a DCN group (e.g., determines that the message's destination IP address is the VIP of a DCN group) whose input data should be load balanced by the load balancer. The load balancer then replaces the virtual address in the data message with a DCN VM's physical address (e.g., the VM's IP address) that is stored in the LB rule storage 440. The changing of the destination virtual address to a DCN VM's physical address is a form of destination network address translation. As the virtual address is replaced by a physical address, the virtual address does not have to be routed out of the host, which simplifies the deployment of the load balancing scheme.

In selecting the DCN VM that should receive the data message, the load balancer in some embodiments uses the load balancing criteria that is stored in the LB rule storage 440. After changing the network address of the received data message, the load balancer supplies the data message to the SFE for it to process so that the data message can reach the addressed DCN VM. One intrinsic advantage of this approach is that no source address translation (e.g., source NAT) is required because the traffic comes back to the SCN VM that generated the traffic.

The STAT data storage 445 stores statistics regarding the load balanced data messages. For instance, as the load balancers 305 spread the data messages to one or more load balanced DCN groups, the load balancers in some embodiments store statistics about how many data messages and/or how many data flows are being sent to each DCN in each load balanced DCN group. In other embodiments, the load balancers store other statistics, as further described below. While one STAT data storage 445 is shown for all load balancers 305 in FIG. 4, one of ordinary skill in the art will realize that in other embodiments each load balancer 305 has its own STAT data storage 445.

In some embodiments, the statistics that are stored in the STAT data storage 445 on each host are passed to a set of one or more LB controllers that facilitate the DLB operations of some embodiments. The controller set then aggregates the statistics that it receives from each host. The controller set then (1) distributes the aggregated statistics to each host so that each host can define and/or adjust its load balancing criteria, and/or (2) analyzes the aggregated statistics to specify and distribute some or all of the load balancing criteria for the load balancers to enforce. In this manner, the load balancing criteria can be dynamically adjusted based on the statistics that are stored in the STAT data storage 445.

In some embodiments, the controller set also dynamically instantiates or allocates VMs to SCN or DCN groups in order to reduce the load in any load balanced DCN group. The controller set can also dynamically instantiate or allocate VMs to SCN or DCN groups when it detects that a VM in one of these groups has crashed or has other operational issues. In such circumstances, the load balancing operations of the distributed load balancers can be adjusted in order to use the newly instantiated or allocated VM, and to reduce or eliminate the use of the VM that has crashed or has operational issues.

Figure 5:
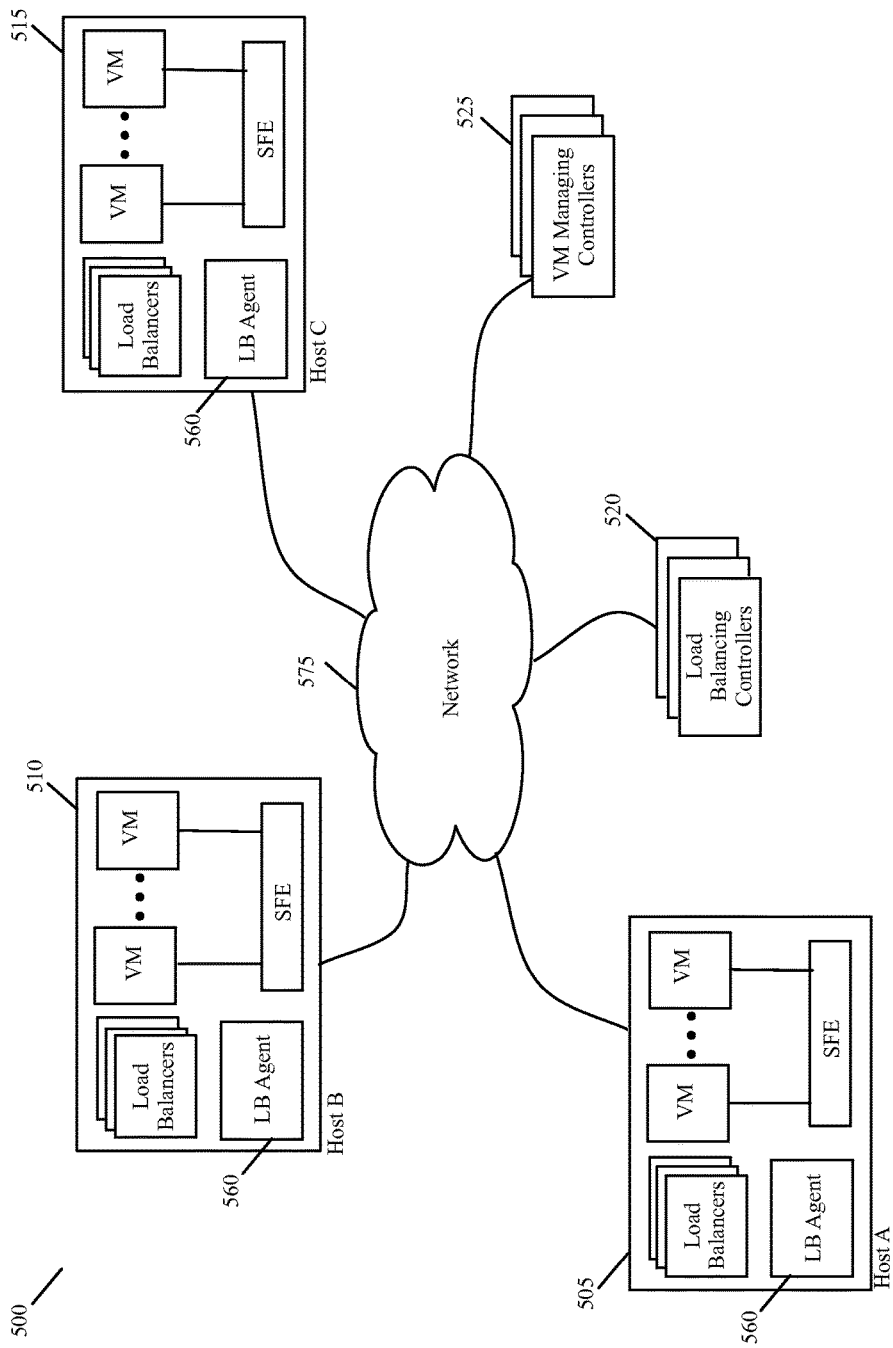
FIG. 5 illustrates an example of a controller set that gathers statistics from hosts and based on the gathered statistics, dynamically adjusts the load balancing operations.

FIG. 5 illustrates an example of a controller set that gathers statistics from hosts and based on the gathered statistics, dynamically adjusts the load balancing operations. Specifically, this figure illustrates a multi-host system 500 of some embodiments. As shown, this system includes multiple virtualized hosts 505-515, a set of load balancing (LB) controllers 520, and a set of one or more VM managing controllers 525. As shown in FIG. 5, the hosts 505-515, the LB controller set 520, and the VM manager set 525 communicatively couple through a network 575, which can include a local area network (LAN), a wide area network (WAN) or a network of networks (e.g., Internet).

The VM managing controllers 525 provide control and management functionality for defining (e.g., allocating or instantiating) and managing one or more VMs on each host. These controllers in some embodiments also provide control and management functionality for defining and managing multiple logical networks that are defined on the common software forwarding elements of the hosts. In some embodiments, the hosts 505-515 are similar to the hosts 405-430 of FIG. 4, except that the hosts 505-515 each are shown to include an LB agent 560 for interacting with the LB controller set 520, while not showing the other components of the hosts, such as LB and STAT data storages 440 and 445. The LB agents 560 gather the collected statistics from the STAT data storage 445, and relay these statistics to the LB controller set 520. In some embodiments, the LB agents 560 aggregate and/or analyze some of the statistics before relaying processed statistics to the LB controller set, while in other embodiments the LB agents relay collected raw statistics to the LB controller set.

The LB controller set 520 aggregates the statistics that it receives from the LB agents of the hosts. In some embodiments, the LB controller set 520 then distributes the aggregated statistics to the LB agents that execute on the hosts. These agents then analyze the aggregated statistics to generate and/or to adjust LB rules or criteria that the load balancers that execute on the same hosts as the agents enforce.

In other embodiments, the controller set analyzes the aggregated statistics to generate and/or to adjust LB rules or criteria, which the controller set then distributes to the hosts for their load balancers to enforce. In some of these embodiments, the controller set distributes the same LB rules and/or criteria to each load balancer in a group of associated load balancers (i.e., in a group of load balancers that distribute the data messages amongst the DCNs of a group of DCNs), while in other embodiments, the controller distributes different LB rules and/or criteria to different load balancers in the group of associated load balancers. Also, in some embodiments, the controller set distributes updated LB rules and/or criteria to some of the load balancers in an associated group of load balancers, while not distributing the updated LB rules and/or criteria to other load balancers in the associated group.

In still other embodiments, the controller set generates and distributes some load balancing rules or criteria based on the aggregated statistics, while also distributing some or all aggregated statistics to the hosts so that their LB agents can generate other load balancing rules or criteria. One of ordinary skill in the art will realize that the LB rules and/or criteria are not always adjusted based on the aggregated statistics. Rather the LB rules and/or criteria are modified only when the aggregated statistics require such modification.

Irrespective of the implementation for generating the LB rules, the collection and aggregation of the data traffic statistics allows the LB rules or criteria to be dynamically adjusted. For instance, when the statistics show one DCN as being too congested with data traffic, the LB rules or criteria can be adjusted dynamically for the load balancers of the SCNs that send data messages to this DCN's group, in order to reduce the load on this DCN while increasing the load on one or more other DCNs in the same DCN group. In some embodiments, the collection and aggregation of the data traffic statistics also allows the LB controller set 520 to reduce the load on any DCN in a load balanced DCN group by dynamically directing the VM managing controller set 525 to instantiate or allocate new DCN VMs for the DCN group or by instantiating or allocating new SCN VMs.

Figure 6:
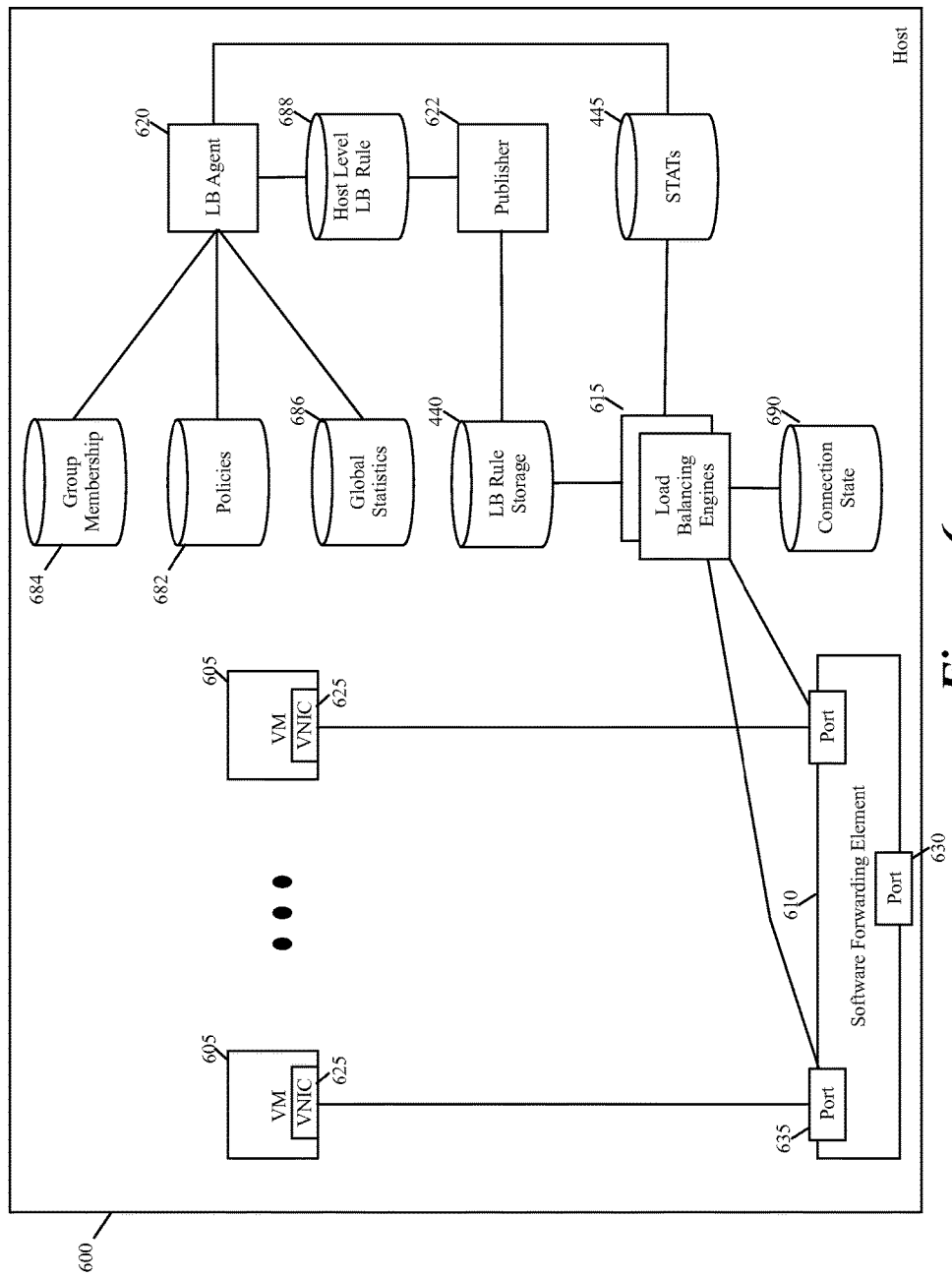
FIG. 6 illustrates a more detailed architecture of a host that executes the load balancing modules of some embodiments of the invention.

FIG. 6 illustrates a more detailed architecture of a host 600 that executes the load balancing modules of some embodiments of the invention. As shown, the host 600 executes multiple VMs 605, an SFE 610, a set of one or more load balancers 615, an LB agent 620, and a publisher 622. The host also has LB rule storage 440 and the STAT data storage 445, as well as group membership data storage 684, policy data storage 682, aggregated (global) statistics data storage 686, and connection state storage 690.

The SFE 610 executes on the host to communicatively couple the VMs of the host to each other and to other devices outside of the host (e.g., other VMs on other hosts) through one or more forwarding elements (e.g., switches and/or routers) that operate outside of the host. As shown, the SFE 610 includes a port 630 to connect to a physical network interface card (not shown) of the host, and a port 635 to connect to the VNIC 625 of each VM. In some embodiments, the VNICs are software abstractions of the physical network interface card (PNIC) that are implemented by the virtualization software (e.g., by a hypervisor). Each VNIC is responsible for exchanging data messages between its VM and the SFE 610 through its corresponding SFE port. As shown, a VM's egress datapath for its data messages includes (1) the VM's VNIC 625, (2) the SFE port 635 that connects to this VNIC, (3) the SFE 610, and (4) the SFE port 630 that connects to the host's PNIC.

Through its port 630 and a NIC driver (not shown), the SFE 610 connects to the host's PNIC to send outgoing packets and to receive incoming packets. The SFE 610 performs message-processing operations to forward messages that it receives on one of its ports to another one of its ports. For example, in some embodiments, the SFE tries to use header values in the VM data message to match the message to flow based rules, and upon finding a match, to perform the action specified by the matching rule (e.g., to hand the packet to one of its ports 630 or 635, which directs the packet to be supplied to a destination VM or to the PNIC). In some embodiments, the SFE extracts from a data message a virtual network identifier and a MAC address. The SFE in these embodiments uses the extracted VNI to identify a logical port group, and then uses the MAC address to identify a port within the port group. In some embodiments, the SFE 610 is a software switch, while in other embodiments it is a software router or a combined software switch/router.

The SFE 610 in some embodiments implements one or more logical forwarding elements (e.g., logical switches or logical routers) with SFEs executing on other hosts in a multi-host environment. A logical forwarding element in some embodiments can span multiple hosts to connect VMs that execute on different hosts but belong to one logical network. In other words, different logical forwarding elements can be defined to specify different logical networks for different users, and each logical forwarding element can be defined by multiple SFEs on multiple hosts. Each logical forwarding element isolates the traffic of the VMs of one logical network from the VMs of another logical network that is serviced by another logical forwarding element. A logical forwarding element can connect VMs executing on the same host and/or different hosts.

The SFE ports 635 in some embodiments include one or more function calls to one or more modules that implement special input/output (I/O) operations on incoming and outgoing packets that are received at the ports. One of these function calls for a port is to a load balancer in the load balancer set 615. In some embodiments, the load balancer performs the load balancing operations on outgoing data messages that are addressed to DCN groups whose input traffic is being spread among the DCNs in the group in order to reduce the load on any one DCN. For the embodiments illustrated by FIG. 6, each port 635 has its own load balancer 615. In other embodiments, some or all of the ports 635 share the same load balancer 615 (e.g., all the ports share one load balancer, or all ports that are part of the same logical network share one load balancer).

Examples of other I/O operations that are implemented by the ports 635 include firewall operations, encryption operations, message encapsulation operations (e.g., encapsulation operations needed for sending messages along tunnels to implement overlay logical network operations), etc. By implementing a stack of such function calls, the ports can implement a chain of I/O operations on incoming and/or outgoing messages in some embodiments. Instead of calling the I/O operators (including the load balancer set 615) from the ports 635, other embodiments call these operators from the VM's VNIC or from the port 630 of the SFE.

The load balancers 615 perform their load balancing operations based on the LB rules that are specified in the LB rule storage 440. For a virtual address (e.g., VIP) of a load balanced DCN group, the LB rule storage 440 stores a load balancing rule that specifies two or more physical addresses (e.g., IP addresses) of DCNs of the group to which a data message can be directed. In some embodiments, this load balancing rule also includes load balancing criteria for specifying how the load balancer should spread the traffic across the DCNs of the group associated with a virtual address.

Figure 7:
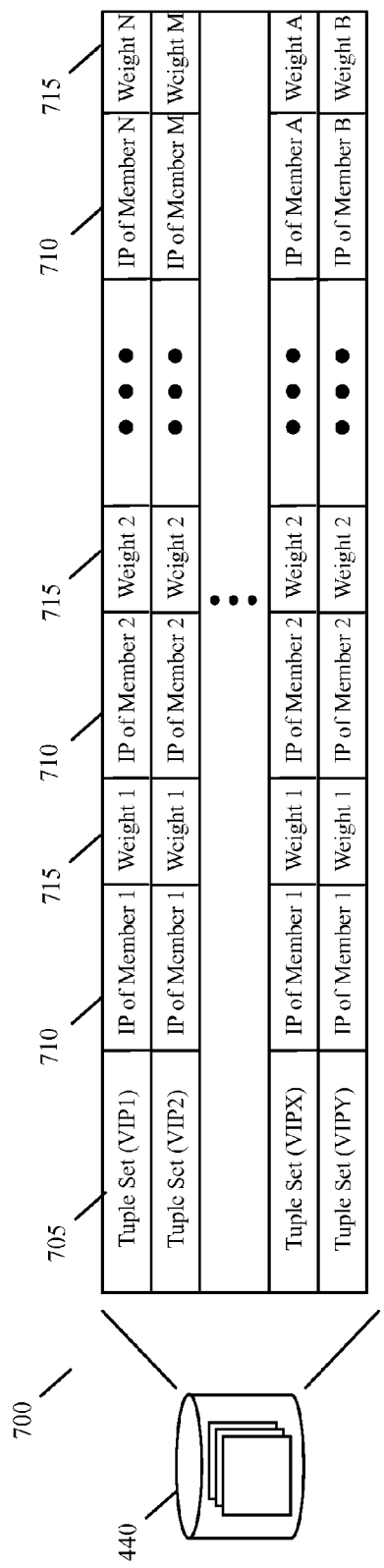
FIGS. 7 and 8 presents examples of load balancing rules of some embodiments.

One example of such load balancing criteria is illustrated in FIG. 7, which presents examples of load balancing rules that are stored in the LB rule storage 440. As shown, this data storage includes multiple LB rules 700, with each LB rule associated with one load balanced DCN group. In this example, each load balance rule includes (1) a set of data-message identifying tuples 705, (2) several IP addresses 710 of several DCNs of the load balanced DCN group, and (3) a weight value 715 for each IP address.

Each rule's tuple set 705 includes the VIP address (as the destination IP address) of the rule's associated DCN group. In some embodiments, the tuple set 705 only includes the VIP address. In other embodiments, the tuple set also includes other data message identifiers, such as source IP address, source port, destination port, and protocol, which together with the destination IP address form the five-tuple header values. In some embodiments, a load balancer searches a LB data storage by comparing one or more message identifier values (e.g., the destination IP address, or one or more of the five-tuple header values) to the rule tuple sets 705 to identify a rule that has a tuple set that matches the message identifier values.

Each LB rule's IP addresses 710 are the IP addresses of the DCNs that are members of the DCN group that has the VIP address specified in the rule's tuple set 705. In some embodiments, the addresses of the DCNs are supplied as a part of the data initially supplied by the controller set (e.g., in order to configure the load balancer) or are supplied in subsequent updates to the DCN group information that is provided by the controller set.

The weight values 715 for the IP addresses of each LB rule provides the criteria for a load balancer to spread the traffic to the DCNs that are identified by the IP addresses. For instance, in some embodiments, the load balancers use a weighted round robin scheme to spread the traffic to the DCNs of the load balanced DCN group. As one example, assume that the DCN group has five DCNs and the weight values for the IP addresses of these DCNs are 1, 3, 1, 3, and 2. Based on these values, a load balancer would distribute data messages that are part of ten new flows as follows: 1 to the first IP address, 3 to the second IP address, 1 to the third IP address, 3 to the fourth IP address, and 2 to the fifth IP address.

As further described below, the weight values for an LB rule are generated and adjusted by the LB agent 620 and/or LB controller set in some embodiments based on the LB statistics that the load balancers store in the STAT data storage 445. To gracefully switch between different load balancing criteria, the LB rules in some embodiments specify time periods for different load balancing criteria of a LB rule that are valid for different periods of time.

Figure 8:
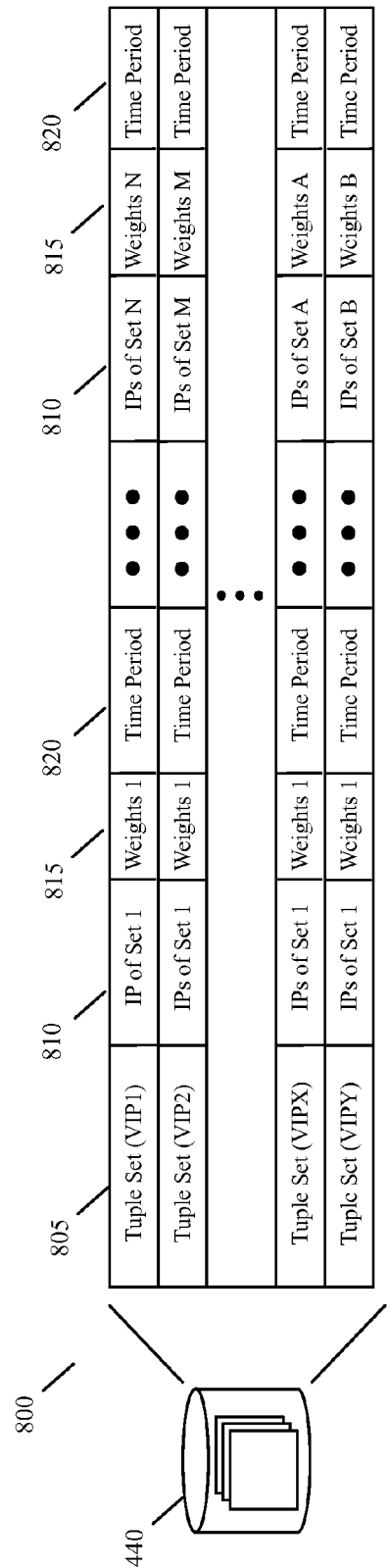

FIG. 8 illustrates an example of load balancing rules 800 with such time period parameters. These LB rules are stored in the LB rule storage 440 in some embodiments. Each LB rule 800 has one message identifying tuple 805, one or more IP address sets 810, and one or more weight value sets 815. Each IP address set 810 has two or more IP addresses, and each weight value set 815 is associated with an IP address set and has one weight value for each IP address in its associated IP address set.

In the example illustrated in FIG. 8, each rule has multiple sets of IP addresses and multiple sets of weight values. Each set of IP addresses and its associated set of weight values represents one set of load balancing criteria. For each of these sets of load balancing criteria, each rule has a time value 820 that specifies the time period during which the IP address set 810 and its associated weight value set 815 are valid. For instance, in a LB rule, the time value for one IP address set might specify "before 1 pm on 9/1/2014," while the time value for another IP address set might specify "after 12:59 pm on 9/1/2014." These two time periods allow the load balancers to seamlessly switch from using one IP address set and its associated weight value set to another IP address set and its associated weight value set at 1 pm on 9/1/2014. These two IP address sets might be identical and they might only differ in their associated weight value sets. Alternatively, the two IP address sets might be different. Two IP address sets might differ but have overlapping IP addresses (e.g., one set might have five IP addresses, while another set might have four of these five IP addresses when one DCN is added or removed from a DCN group). Alternatively, two IP address sets might differ by having no IP addresses in common.

In FIG. 8, the time period values and the weight values are used in the LB rules. One of ordinary skill in the art will realize that in other embodiments, the LB rules do include the weight values, but include the time values to allow the load balancer to gracefully switch between different sets of load balanced DCNs. As before, two DCN sets may differ by having mutually exclusive DCNs, or they may differ by having one or more DCNs in common and one or more DCNs not in common.

As shown in FIG. 6, the host also includes a connection state storage 690 in which the load balancer stores data records that allow the load balancer to maintain connection state for data messages that are part of the same flow, and thereby to distribute data messages that are part of the same flow statefully to the same DCN. More specifically, whenever a load balancer identifies a DCN for a data message based on the message's group destination address (e.g., the destination VIP), the load balancer not only replaces the group destination address with the DCN's address (e.g., with the DCN IP address), but also stores a record in the connection state storage 690 to identify the DCN for subsequent data messages that are part of the same flow. This record stores the destination IP address of the identified DCN along with the data message's header values (e.g., the five tuple values). In some embodiments, for fast access, the connection data storage 690 is hash indexed based on the hash of the data message header values.

To identify a DCN for a received data message, the load balancer first checks the connection state storage 690 to determine whether it has previously identified a DCN for receiving data messages that are in the same flow as the received message. If so, the load balancer uses the DCN that is identified in the connection state storage. Only when the load balancer does not find a connection record in the connection state storage 690, the load balancer in some embodiments examines the LB rules in the LB rule storage 440 in order to identify a DCN to receive the data message.

By searching the connection state storage 690 with the message identifiers of subsequent data messages that are part of the same flow, the load balancer can identify the DCN that it previously identified for a data message of the same flow, in order to use the same DCN for the messages that are part of the same flow (i.e., in order to statefully perform its load balancing operation). In some embodiments, the load balancer also uses the connection state storage 690 records to replace the DCN's destination address with the virtual group address (e.g., the group VIP address) on the reverse flow path when the load balancer receives (from the SFE port 630 or 635) data messages sent by the DCN to the SCN. After translating of the destination addresses of a data message in the reverse flow, the load balancer returns the data message to the SFE port that called it, so that the SFE port can direct the data message to SCN VM.

In some embodiments, the connection state storage 690 is addressed differently than the LB data storage 440. For instance, as mentioned above, the connection state storage 690 in some embodiments stores its connection-state records based on hashed message identifier values (e.g., five tuple identifier values), while not using such a hash addressing scheme for the LB rule data storage 440. In some embodiments, the hashed values specify memory locations in the connection state storage 690 that store the corresponding message-identifier sets. Because of this addressing scheme, the load balancer generates a hash of the message-identifier set to identify one or more locations in the connection state storage 690 to examine for a matching message-identifier set. In other embodiments, the LB rule data storage 440 is also hash indexed based on the hash of the tuple set 705.

In FIG. 6, only one LB rule data storage 440 and only one connection state storage 690 are illustrated for all the load balancers 615. In other embodiments, each load balancer has its own rule data storage 440 and connection state storage 690. In yet other embodiments, the host has several rule data storages 440 and connection state storages 690, but two or more load balancers can share a rule data storage or connection state storage (e.g., two load balancers that are balancing the load for two VMs that are part of the same logical network). As further described below by reference to FIG. 18, each load balancer 615 having its own rule data storage 440 and connection state storage 690 allows these storages to be smaller and easier to search more quickly.

In some embodiments, each time a load balancer 615 performs a load balancing operation on a data message (i.e., replaces the destination virtual address of the message to a destination address of a DCN), the load balancer updates the statistics that it maintains in the STAT data storage 445 for the data traffic that it relays to the DCN that was addressed as part of its load balancing operation. Several examples of statistics were provided above and will be further described below.

In some embodiments, the LB agent 620 gathers (e.g., periodically collects) the statistics that the load balancers store in the STAT data storage(s) 445, and relays these statistics to the LB controller set 520. Based on statistics that the LB controller set 520 gathers from various LB agents of various hosts, the LB controller set (1) distributes the aggregated statistics to each host's LB agent so that each LB agent can define and/or adjust its load balancing criteria, and/or (2) analyzes the aggregated statistics to specify and distribute some or all of the load balancing criteria for the load balancers to enforce.

In some embodiments where the LB agent receives new load balancing criteria from the LB controller set, the LB agent stores these criteria in the host-level LB rule storage 688 for propagation to the LB rule storage(s) 440. In the embodiment where the LB agent receives aggregated statistics from the LB controller set, the LB agent stores the aggregated statistics in the global statistics data storage 686. In some embodiments, the LB agent 620 analyzes the aggregated statistics in this storage 686 to define and/or adjust the load balancing criteria (e.g., weight values), which it then stores in the LB rule storage 688 for propagation to the LB rule storage(s) 440. The publisher 622 retrieves each LB rule that the LB agent 620 stores in the LB rule storage 688, and stores the retrieved rule in the LB rule storage 440 of the load balancer 615 that needs to enforce this rule.

The LB agent 620 not only propagates LB rule updates based on newly received aggregated statistics, but it also propagates LB rules or updates LB rules based on updates to DCN groups that it receives from the LB controller set 520. The LB agent 620 stores each DCN group's members that it receives from the LB controller set 520 in the group data storage 684. When a DCN is added or removed from a DCN group, the LB agent 620 stores this update in the group storage 684, and then formulates updates to the LB rules to add or remove the destination address of this DCN to or from the LB rules that should include or already include this address. Again, the LB agent 620 stores such updated rules in the rule data storage 688, from where the publisher propagates them to the LB rule storage(s) 440 of the load balancers that need to enforce these rules.

When a DCN is added to a DCN group, the updated LB rules cause the load balancers to direct some of the DCN-group data messages to the added DCN. Alternatively, when a DCN is removed from a DCN group, the updated LB rules cause the load balancers to re-direct data messages that would go to the removed DCN, to other DCNs in the group. However, even after a DCN is intentionally designated for removal from a DCN group, a load balancer in some embodiments may continue to send data messages (e.g., for a short duration of time after the removal of the DCN) to the DCN that are part of prior flows that were directed to the DCN. This allows the DCN to be removed gradually and gracefully from the DCN group as the flows that it handles terminate. Some embodiments also achieve a graceful transition away from a DCN that should be removed from the DCN group by using time values to specify when different LB criteria for the same LB rule should be used. Some embodiments also use such time values to gracefully add a new DCN to a DCN group.

In some embodiments, the LB agent 620 stores in the policy storage 682, LB policies that direct the operation of the LB agent in response to newly provisioned DCN VMs and their associated load balancers, and/or in response to updated global statistics and/or adjusted DCN group membership. The policies in the policy storage 682 in some embodiments are supplied by the LB controller set 520.

Figure 9:
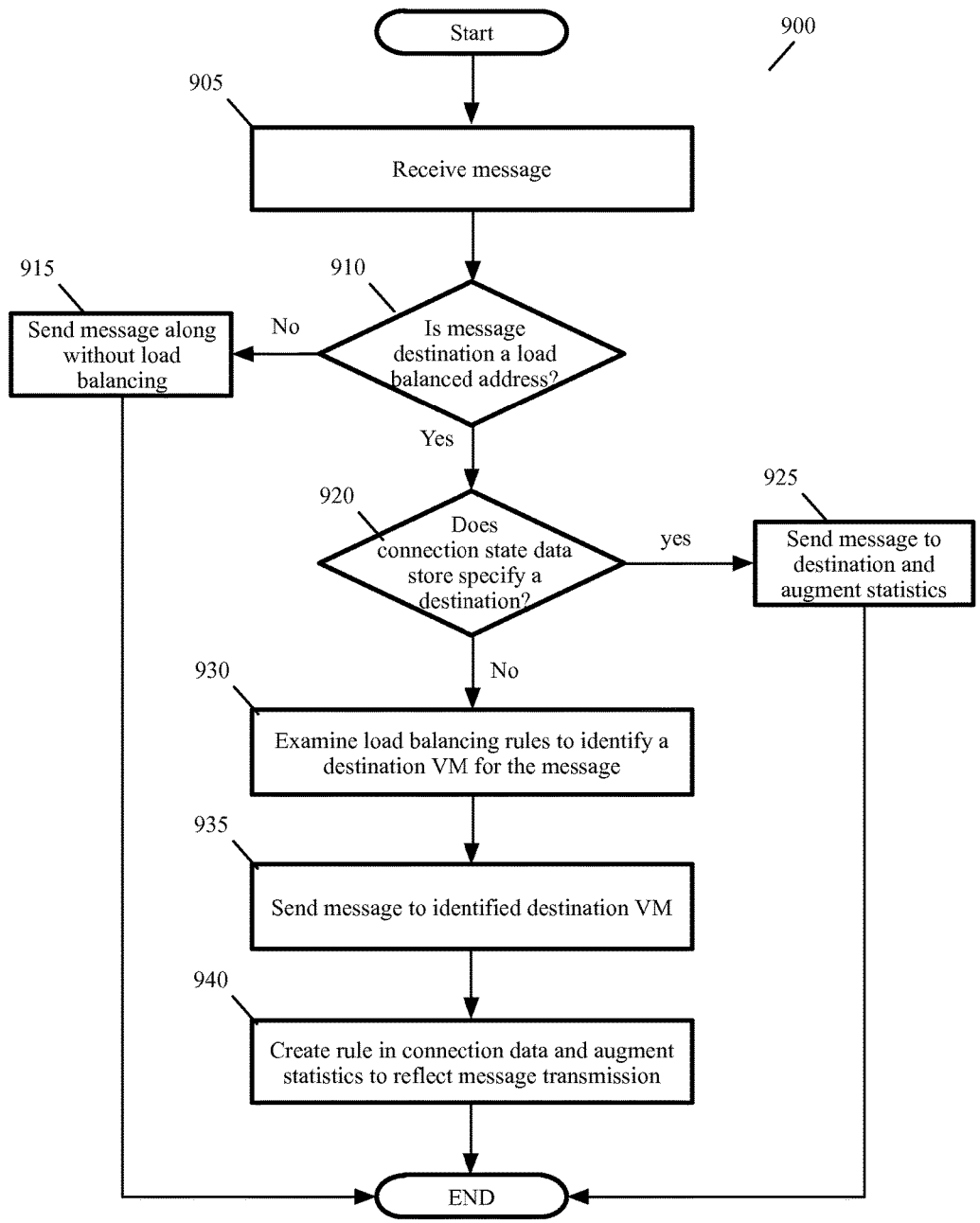
FIG. 9 illustrates a process that a load balancer performs in some embodiments.

FIG. 9 illustrates a process 900 that the load balancer 615 performs in some embodiments. As shown, the process 900 starts when the load balancer receives (at 905) a data message from its corresponding SFE port 635. This port relays this message when it receives the data message from its VM. In some embodiments, the port relays the data message by passing to the load balancer a reference (e.g., a handle that identifies a location in memory that stores the data message) to the data message.

Next, the process determines (at 910) whether the received data message's destination address is a virtual address (e.g., the VIP address) of a DCN group that the load balancer has to balance its input. To make this determination, the process 900 checks a table in the LB rule data storage 440 that stores the virtual addresses of the DCN groups that the process load balances.

When the process determines (at 910) that the data message is not directed to a load balanced virtual address, the process sends (at 915) the message along the message's datapath without performing any destination address translation on the message. This operation (at 915) entails informing the SFE port 635 that called it, that the process has completed processing the VM data message. The SFE port 635 can then handoff the VM data message to the SFE 610 or can call another I/O chain operator to perform another operation on the VM data message. After 915, the process ends.

On the other hand, when the process determines (at 910) that the data message is directed to a load balanced virtual address, the process determines (at 920) whether the connection state cache 690 stores a record that identifies the DCN to which the data message should be routed. As mentioned above, each time a load balancer uses a LB rule to direct a new data message flow a DCN of a DCN group, the load balancer in some embodiments creates a record in the connection state cache 690 to store the physical IP address of the DCN, so that when the load balancer receives another data message within the same flow (i.e., with the same message-attribute set), it can route it to the same DCN that it used for previous data message in the same flow.

Also, as mentioned above, the connection-state cache 690 in some embodiments stores each flow's record based on hashed address values that are hashed versions of the flow identifying attributes of the data message header values. This addressing scheme allows the load balancer to quickly search the cache 690. Hence, before searching the rule data store 440, the load balancer first generates a hash value from the message-attribute set of the received data message (e.g., a hash of the message's five tuples) to identify one or more memory locations in the cache 690, and then uses this hash value to examine the memory location(s) to determine whether the cache stores a connection-flow record with a matching set of attributes as the received VM data message.

When the process 900 identifies (at 920) a record for the received data message's flow in the cache 690, the process (at 925) then replaces the message's destination address (i.e., the virtual group address, such as the VIP address) with the DCN destination address (e.g., with the DCN IP address) that is stored in the record in the cache 690. At 925, the process sends the address-translated data message along its datapath. In some embodiments, this operation entails returning a communication to the SFE port 635 (that called the load balancer to initiate the process 900) to let the port know that the load balancer is done with its processing of the VM data message. The SFE port 635 can then handoff the data message to the SFE 610 or can call another I/O chain operator to perform another operation on the data message. At 925, the process 900 also updates in some embodiments the statistics that it maintains in STAT storage 445 for the DCN to which the message was addressed by the process 900. This update reflects the transmission of a new data message to this DCN. After 925, the process 900 ends.

When the process 900 determines (at 920) that the connection cache 690 does not store a record for the received data message's flow, the process 900 searches (at 930) the LB rule data store 440 to identify an LB rule for the data message received at 905. To identify the LB rule in the data store 440, the process in some embodiments compares a set of attributes of the received data message with the data-message identifying tuples (e.g., tuples 705 of FIG. 7) of the rules to identify a rule that has a tuple set that matches the message's attribute set. In some embodiments, the process uses different message-attribute sets to perform this comparison operation. For instance, in some embodiments, the message attribute set includes just the destination IP address of the message (e.g., the VIP of the addressed DCN group), which was used at 910 to determine whether the message is directed to a load balanced DCN group. In other embodiments, the message attribute set includes other attributes, such as one or more of the other five-tuple identifiers (e.g., one or more of the source IP, source port, destination port, and protocol). In some embodiments, the message attribute set includes logical network identifiers such as virtual network identifier (VNI), virtual distributed router identifier (VDRI), a logical MAC address, a logical IP address, etc.

As mentioned above, each LB rule in some embodiments includes two or more destination addresses (e.g., IP addresses 710), which are the destination addresses (e.g., IP addresses) of the DCNs that are members of the DCN group that has the virtual address (e.g., VIP address) specified in the rule's tuple set 705. When the process identifies an LB rule (at 930), it selects one of the destination addresses (e.g., IP addresses) of the rule to replace the virtual address (e.g., the VIP address) in the message. Also, as mentioned above, each LB rule stores criteria for facilitating the process' selection of one of the destination addresses of the LB rule to replace the message's virtual destination identifier. In some embodiments, the stored criteria are the weight and/or times values that were described above by reference to FIGS. 7 and 8. Accordingly, in some embodiments, the process 900 selects one of the matching rule's destination addresses based on the selection criteria stored in the rule.

After changing the destination address of the data message, the process (at 935) sends the data message along its datapath. Again, in some embodiments, this operation entails returning a communication to the SFE port 635 (that called the load balancer to initiate the process 900) to let the port know that the load balancer is done with its processing of the data message. The SFE port 635 can then handoff the VM data message to the SFE 610 or can call another I/O chain operator to perform another operation on the VM data message.

After 935, the process transitions to 940, where in the connection cache data store 690, it creates a record to identify the DCN (i.e., to identify the DCN destination identifier) to use to forward data messages that are part of the same flow as the data message received at 905. In some embodiments, this record is addressed in the cache 690 based on a hash value of the message-attribute set identified at 905. At 940, the process 900 also updates the statistics that it maintains in STAT storage 445 for the DCN to which the message was addressed by the process 900. This update reflects the transmission of a new data message to this DCN. After 940, the process ends.

Figure 10:
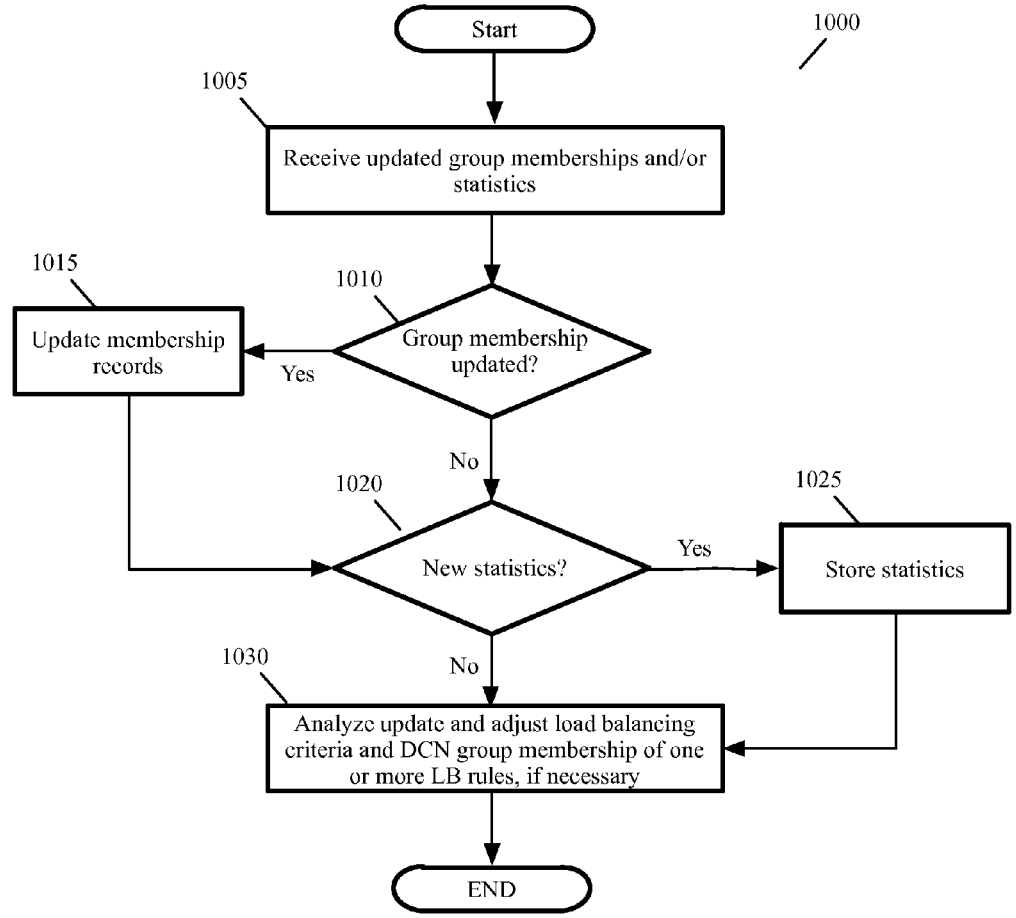
FIGS. 10 and 11 illustrate two processes that a load balancing agent performs in some embodiments.
Figure 11:
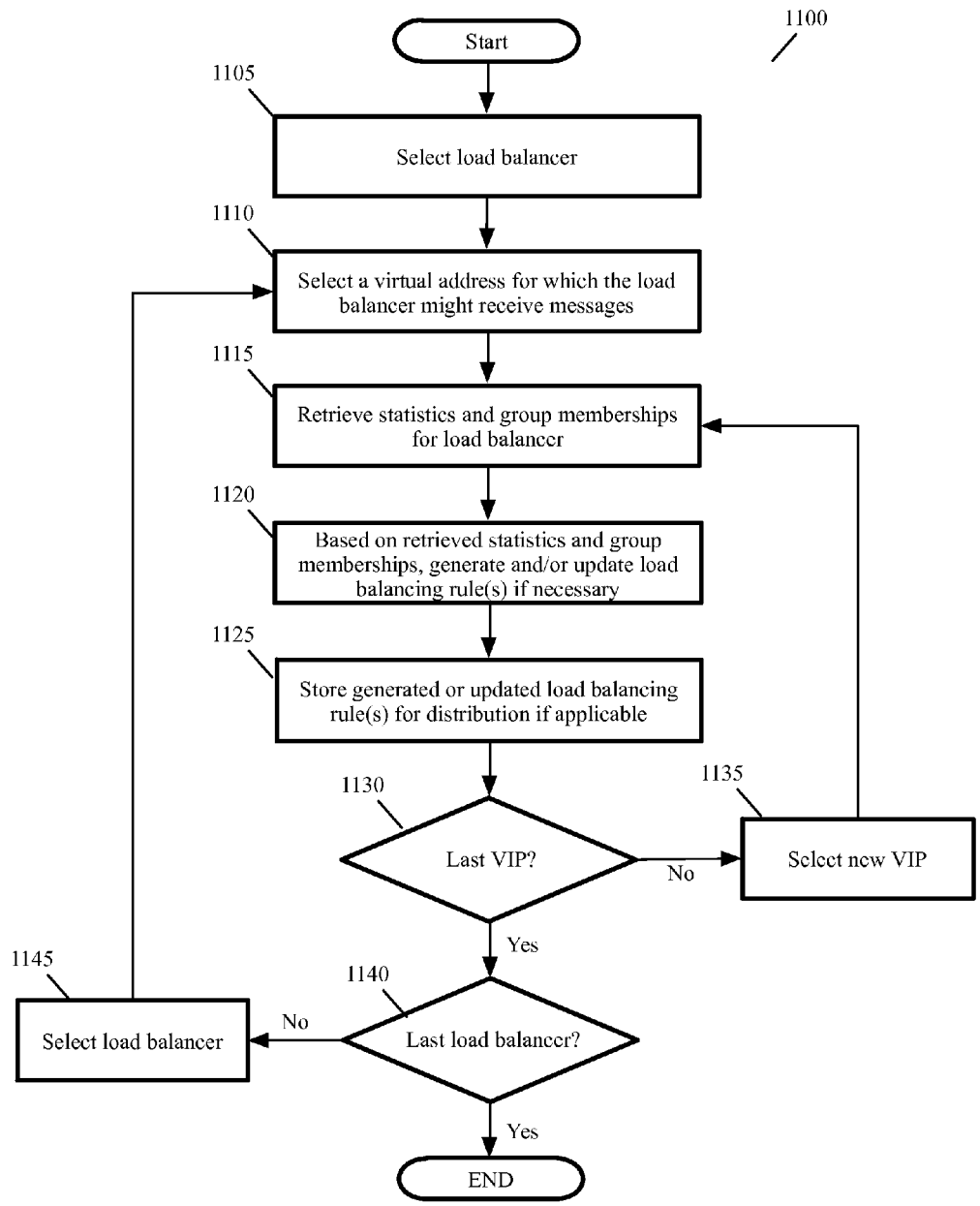

FIGS. 10 and 11 illustrate two processes that the LB agent 620 performs in some embodiments. FIG. 10 illustrates a process 1000 that the LB agent 620 performs each time that it receives updated group memberships and/or global statistics from the LB controller set 520. As shown, the process 1000 starts (at 1005) when it receives from the LB controller set 520 updated statistics for at least one DCN group and/or updated membership to at least one DCN group.

Next, the process 1000 determines (at 1010) whether the received update includes an update to the membership of at least one DCN group for which the LB agents generates and/or maintains the LB rules. If not, the process transitions to 1020. Otherwise, the process creates and/or updates (at 1015) one or more records in the group membership storage 684 to store the updated group membership that the process received at 1005. From 1015, the process transitions to 1020.

At 1020, the process 1000 determines whether the received update includes updated statistics for at least one DCN group for which the LB agents generates and/or maintains the LB rules. If not, the process transitions to 1030. Otherwise, the process creates and/or updates (at 1025) one or more records in the global statistics storage 686 to store the updated global statistics that the process received at 1005. From 1025, the process transitions to 1030.

At 1030, the process initiates a process to analyze the updated records in the group membership storage 684 and/or the global statistics storage 686 to update the group memberships (e.g., the IP addresses) and/or the load balancing criteria (e.g., the weight or time values) of one or more LB rules in the host-level LB rule data storage 688. This analyzing process will be further described below by reference to FIG. 11. From the host-level LB rule data storage 688, the publisher 622 propagates each new or updated LB rule to the LB rule data storage(s) 640 of the individual load balancer(s) 615 (on the same host) that needs to process the new or updated LB rule. In publishing each new or updated LB rule, the publisher 622 does not publish the LB rule to the rule data storage 640 of a load balancer (on the same host) that does not need to process the rule.

After 1030, the process 1000 ends.

FIG. 11 illustrates a process 1100 that the LB agent 620 performs in some embodiments to analyze updated records in the group membership storage 684 and/or the global statistics storage 686, in order to update the group memberships (e.g., the IP addresses) and/or the load balancing criteria (e.g., the weight or time values) of one or more LB rules in the host-level LB rule data storage 688. In some embodiments, the LB agent performs an identical or similar process when the LB agent powers up (e.g., when its host powers up) to configure the LB rules of the load balancers on the host, and when a new SCN VM is instantiated on the host to configure the LB rules of the instantiated VM's load balancer.

As shown, this process 1100 initially selects (at 1105) a load balancer 615 on the LB agent's host. In some embodiments, the process selects (at 1105) only load balancers that are affected by one or more of the updated records that resulted in the performance of this process. Next, at 1110, the process selects a virtual address (e.g., a VIP) of a DCN group that the selected load balancer has to load balance. The process then retrieves (at 1115) the stored statistics and group membership data for the DCN group identified by the selected virtual address.

At 1120, the process analyzes the membership and statistic records retrieved at 1115. Based on this analysis, the process determines whether the group memberships (e.g., the IP addresses) and/or the load balancing criteria (e.g., the weight or time values) of one or more LB rules in the host-level LB rule data storage 688 should be specified and/or modified for the selected load balancer. To perform this analysis, the process 1100 uses one or more policies that are specified in the policy storage 682. If the process determines that it should specify or update the group's membership and/or the load balancing criteria for the selected group, the process performs (at 1120) this specifying or updating, and then stores (at 1125) the specified or updated the group's membership and/or load balancing criteria in one or more LB rules that are stored in the LB data storage 688. As mentioned above, the specified or updated LB rules in the host LB rule storage 688 are distributed by the publisher 622 to the LB data storage 440 of any load balancer that on the same host performs load balancing operations on the input traffic to the selected group. Several examples of updating load balancing criteria and/or group membership will be described below.

After 1125, the process determines (at 1130) whether it has examined all virtual group identifiers (i.e., all the DCN groups) that the selected load balancer has to load balance. If not, it selects (at 1135) another virtual group identifier (i.e., another DCN group) and returns to 1115 to perform operations 1115-1130 for this newly selected virtual group identifier. Otherwise, the process transitions to 1140, where it determines whether it has examined the updates for all the load balancers (e.g., whether it has examined all the load balancers affected by the new or updated group membership and statistic data) on its host. If so, the process ends. If not, the process selects (at 1145) another load balancer on the same host as the LB agent, and then repeats operations 1110-1140 for this newly selected load balancer.

Figure 12:
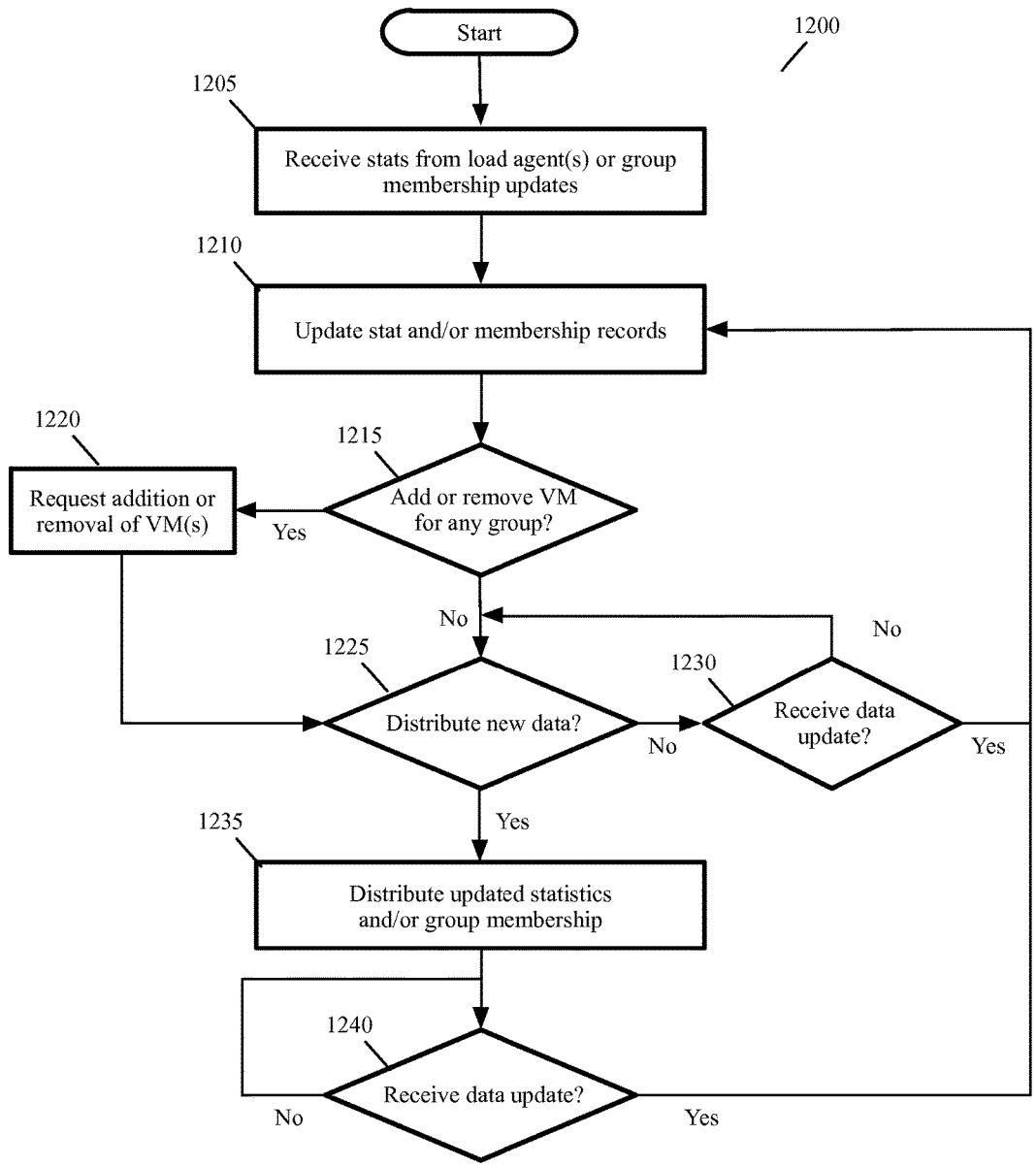
FIG. 12 illustrates a process that a controller set performs in some embodiments.

FIG. 12 illustrates a process 1200 that one or more LB controllers in the LB controller set 520 perform in some embodiments. As shown, the process 1200 starts (at 1205) when it receives statistics from one or more LB agents and/or receives membership updates for one or more DCN groups. The process 1200 in some embodiments receives the group membership updates from another process of the LB controller set. For instance, the LB controller set informs the process 1200 that a new DCN VM has been added to or removed from a DCN group when it is informed by the virtualization manager set 525 that a new VM has been created for or terminated from the DCN group.

After 1205, the process updates (at 1210) (1) the global statistics that the LB controller set 520 maintains based on the statistics received at 1205, and/or (2) the group membership(s) that the LB controller set 520 maintains based on the group updates received at 1205. Next, at 1215, the process determines based on the updated statistics whether it should have one or more SCN or DCN VM specified for or removed from the group. For instance, when the updated statistics causes the aggregated statistics for a DCN group to exceed an overall threshold load value for the DCN group, the process 1200 determines that one or more new DCNs have to be specified (e.g., allotted or instantiated) for the DCN group to reduce the load on DCNs previously specified for the group. Similarly, when the updated statistics causes the aggregated statistics for one or more DCN in the DCN group to exceed a threshold load value, the process 1200 may determine that one or more new DCNs have to be specified (e.g., allotted or instantiated) for the DCN group to reduce the load on the congested DCNs. Conversely, when the updated statistics shows that a DCN in a DCN group is being underutilized or is no longer being used to handle any flows, the process 1200 determines (at 1215) that the DCN has to be removed for the DCN group.

When the process 1200 determines (at 1215) that it should have one or more SCN or DCN VM added or removed for the group, the process requests (at 1220) the VM managing set 525 to add or remove this VM, and then transitions to 1225. The process also transitions to 1225 when it determines (at 1215) that no SCN or DCN VM needs to be added or removed for the group. At 1225, the process determines whether the time has reached for it to distribute membership update and/or global statistics that the LB controller set maintains to one or more LB agents executing on one or more hosts.

In some embodiments, the process 1200 distributes membership updates and/or global statistics on a periodic basis. In other embodiments, however, the process 1200 distributes membership update and/or global statistics for one or more DCN groups whenever this data is modified. In addition to requesting the addition or removal of a VM from a group, the group membership can change when a VM that is part of a group fails. Such VM failures would have to be relayed to the LB agents so that they can modify the LB rules of their associated load balancers. In some embodiments, the membership update data that the process 1200 distributes, differentiates a failed DCN from an intentionally removed DCN (i.e., a DCN that has not failed but has been removed from the DCN group). This differentiation allows a load balancer's operation to be differently modified for the failed DCN and the intentionally removed DCN. For the failed DCN, the load balancer stops using the failed DCN, while for an intentionally removed DCN, the load balancer in some embodiments can continue to use the removed DCN for a duration of time after receiving the membership update (e.g., for new flows up to a particular time, or for previously received flows that are being processed by the DCN). To cause the load balancer to stop using the failed DCN, the connection records that specify the failed DCN in the load balancer's connection storage 690 are removed in some embodiments.

When the process determines (at 1225) that it does not need to distribute new data, it transitions to 1230 to determine whether it has received any more statistic and/or membership updates for which it needs to update its records. If so, the process transitions back to 1210 to process the newly received statistic and/or membership updates. If not, the process transitions back to 1225 to determine again whether it should distribute new data to one or more LB agents.

When the process determines (at 1225) that should distribute membership update(s) and/or global statistics, it distributes (at 1235) this data to one or more LB agents that need to process this data to specify and/or update the load balancing rules that they maintain for their load balancers on their hosts. After 1235, the process determines (at 1240) whether it has received any more statistic and/or membership updates for which it needs to update its records. If not, the process remains at 1240 until it receives statistics and/or membership updates, at which time it transitions back to 1210 to process the newly received statistic and/or membership updates.

In the embodiments described above by reference to FIGS. 10-12, the LB controller set 520 distributes global statistics to the LB agents, which analyze this data to specify and/or adjust the LB rules that they maintain. In other embodiments, however, the LB controller set 520 analyzes the global statistics that it gathers, and based on this analysis specifies and/or adjusts LB rules, which it then distributes to the LB agents. In these embodiments, the LB agents simply store the LB rules or rule modifications that they receive from the LB controller set in the host-level LB rule storage 688 for distribution to the individual LB rule storages 440 of the load balancers 615.

Figure 13:
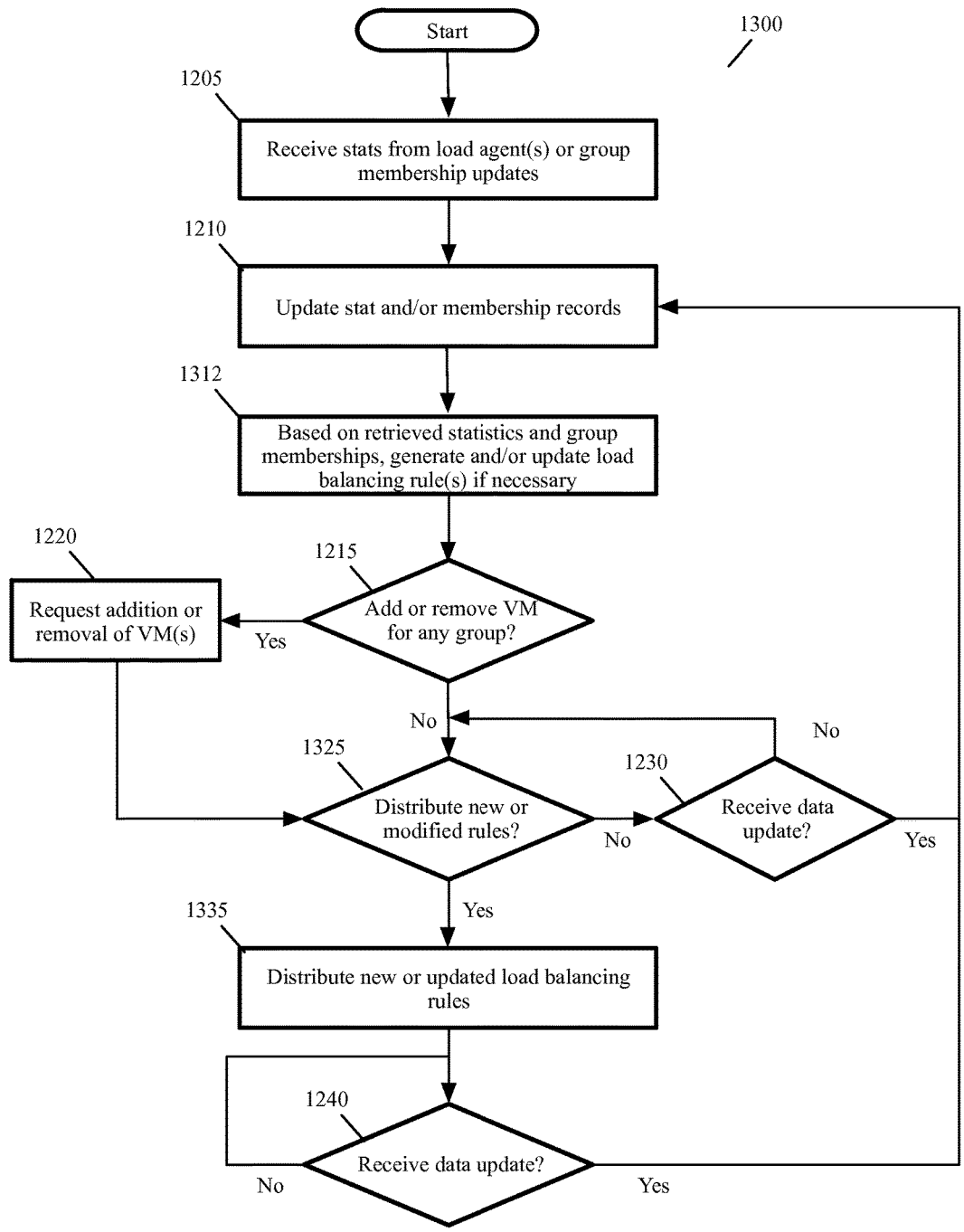
FIG. 13 illustrates a process that shows the operation of the controller set for embodiments in which the controller set analyzes the membership updates and/or global statistics, and in response to this analysis specifies and/or updates LB rules if needed.

FIG. 13 illustrates a process 1300 that shows the operation of the LB controller set for embodiments in which the LB controller set analyzes the membership updates and/or global statistics, and in response to this analysis specifies and/or updates LB rules if needed. This process is similar to the process 1200 of FIG. 12, except for the inclusion of operation 1312 and the replacement of operations 1225 and 1235 with the operations 1325 and 1335.

At 1312, the process 1300 analyzes the membership and statistic records and if needed, specifies and/or updates the group memberships (e.g., the IP addresses) and/or the load balancing criteria (e.g., the weight or time values) of one or more LB rules. This operation is similar to the operation 1120 of the process 1100 of FIG. 11, except when performed by the process 1300 of the LB controller set, the operation 1312 might generate LB rules or rule updates for the load balancers of multiple hosts. From 1312, the process transitions to 1215, which was described above.

At 1325, the process 1300 determines whether it has to distribute the newly specified and/or updated LB rules. If not, the process transitions to 1230, which was described above. Otherwise, the process transitions to 1335 to distribute the newly specified and/or updated LB rules to the LB agents of the hosts that have load balancers that need to enforce the specified and/or updated LB rules. After 1335, the process transitions to 1240, which was described above.

Figure 14:
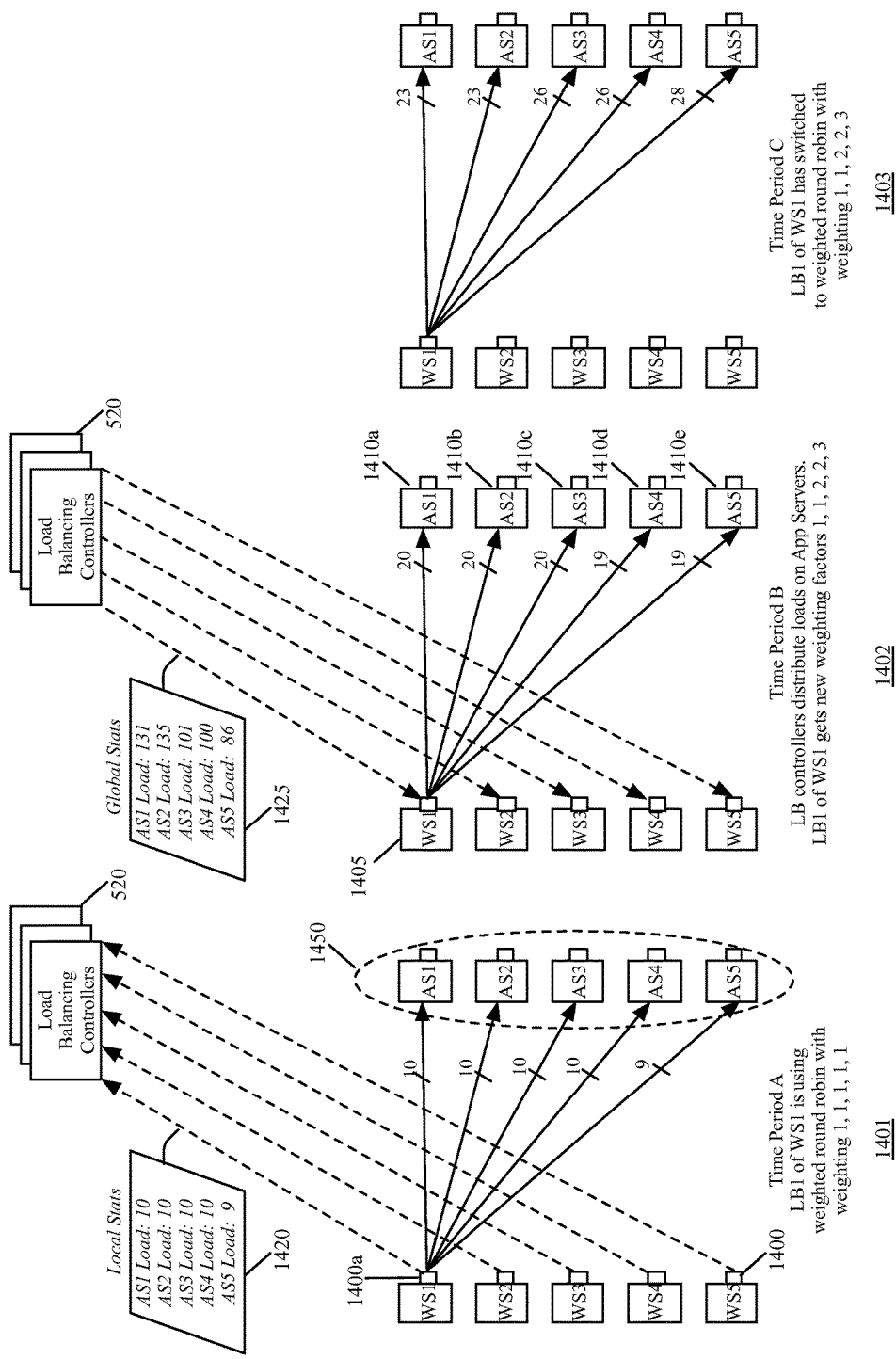
FIGS. 14-16 present several examples that illustrate how some embodiments dynamically adjust the spreading of traffic by adjusting the load balancing criteria and by adding/removing DCN VMs.
Figure 15:
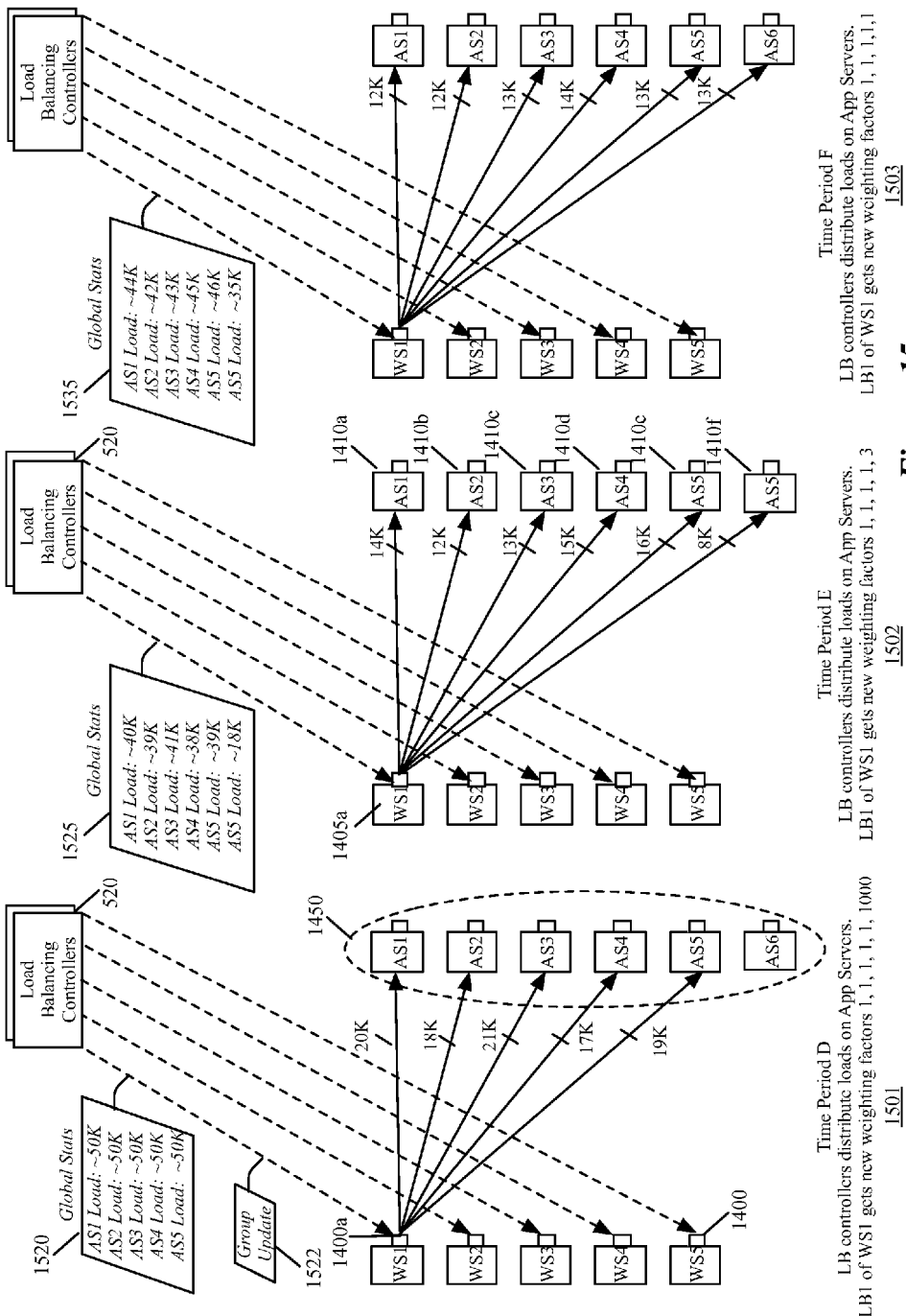
Figure 16:
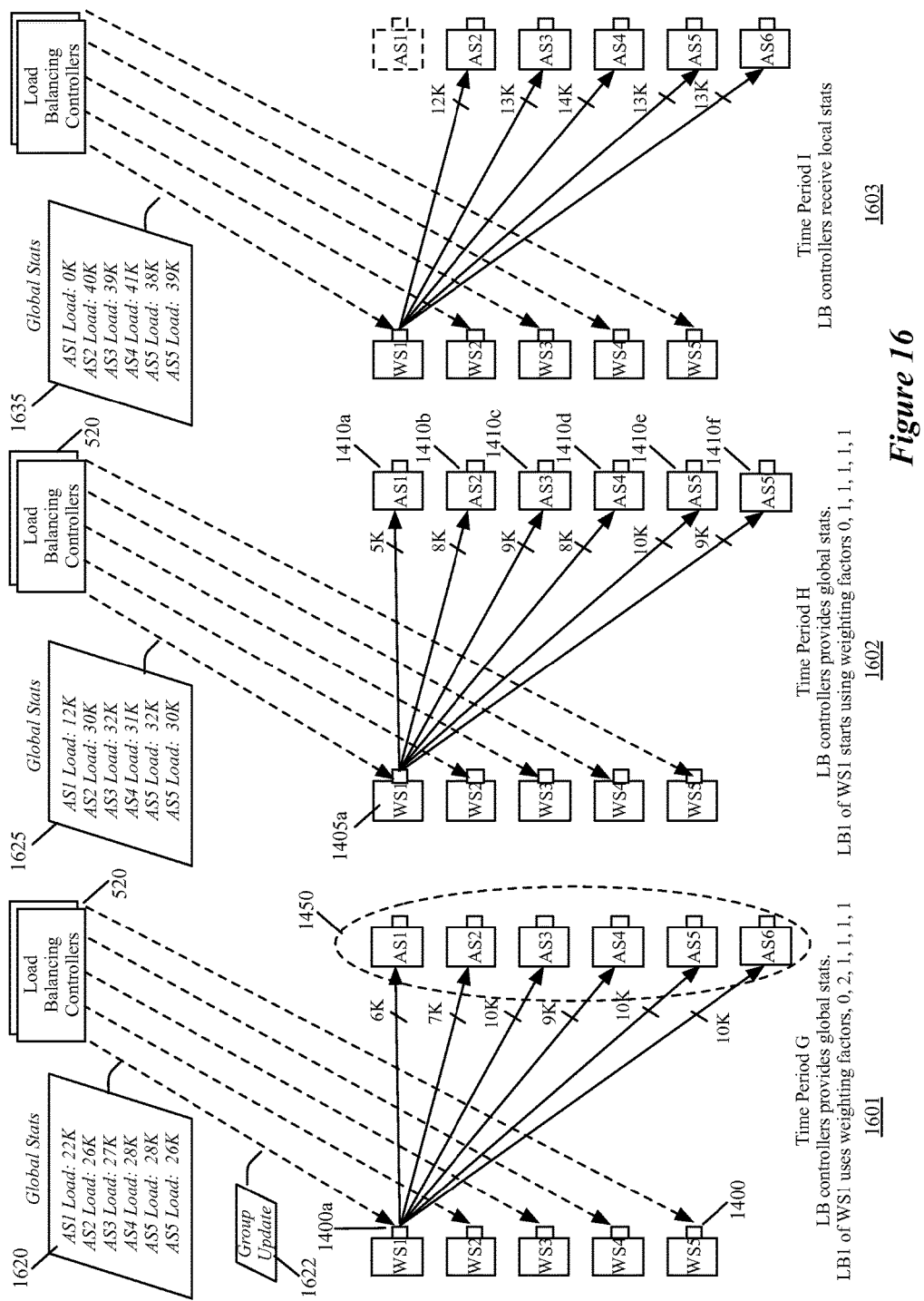

FIGS. 14-16 present several examples that illustrate how some embodiments dynamically adjust the spreading of traffic by adjusting the load balancing criteria and by adding/removing DCN VMs. Each of these examples is illustrated in terms of multiple operational stages that show several inline load balancers 1400 dynamically adjust how they spread the data traffic from several webserver VMs 1405 to several application server VMs 1410. In these examples, each load balancer 1400 is associated with one webserver 1405, while the application server VMs 1410 are part of one DCN group 1450 that is associated with one virtual address identifier. Also, the load balancers 1400, the web servers 1405, and the application server 1410 execute on one or more hosts. On the hosts, one or more LB agents 620 execute to exchange statistics with the LB controller set 520, in order to allow the load balancing operations to be dynamically updated based on dynamically detected load conditions. For the sake of simplifying these figures, the LB agents 620 are not shown in FIGS. 14-16.

In three operational stages 1401-1403, FIG. 14 illustrates an example where the load balancing criteria is adjusted based on dynamically detected load conditions. In this example, each load balancer 1400 uses a weighted round robin scheme to distribute the data messages from its associated webserver 1405. The weight values that control this scheme are adjusted by the LB agent(s) based on global load statistics that are supplied by the LB controller set 520. These statistics specify the load on the application server VMs 1410.

In the first operational stage 1401 of FIG. 14, each load balancer 1400 evenly distributes the data messages of its webserver VMs 1405 among the application server VMs 1410. This even distribution is depicted in this figure by the designation of 10, 10, 10, 10, and 9 on the lines that start on the load balancer 1400a and terminate on the application servers 1410. These numbers are the numbers of active data flows that the load balancer 1400a is directing to the application servers 1410. As shown, the load balancer 1400a in this stage bases its operation on the weight values 1, 1, 1, 1, and 1. These weight values specify that the load balancer should evenly distribute to the five application servers 1410 the next five new data message flows from the webserver 1405a to the application server group 1450.

The first stage 1401 also shows the LB controller set 520 receiving local connection statistics from each of the load balancers 1400. These statistics are gathered and relayed by the load balancers' LB agents, which are not shown in FIG. 14. The first stage 1401 also shows an example of one of the provided local connection statistics, which is the local statistics 1420 that the load balancer 1400a provides to the LB controller set 520. This local statistics 1420 show that the load balancer 1400a currently has 10, 10, 10, 10, and 9 active flows that it is directing respectively to the application servers 1410a-1410e of the group 1450.

In different embodiments, the load balancers use different techniques to quantify the number of active flows that they are directing to each application server 1410. In some embodiments, the load balancers time out (i.e., remove) flows that are inactive (i.e., for which they have not received any new data messages) after a particular duration of time. Other embodiments use other techniques to quantify the number of active flows.

Instead of specifying the number of active flow to express the data traffic load on the DCNs (i.e., the application servers in this example), other embodiments use other traffic metrics. For instance, the load balancers 1400 collect the number of data messages (e.g., data packets) that they route to each application server 1410 in some embodiments. Other examples collect other traffic metrics such as TCP RTT and window size, retransmission, etc. Still other embodiments collect other load metrics (such as round-trip delay, TCP window size, etc.) that express the load that each load balancer detects to each DCN to which the load balancer directs traffic. In some embodiments, the LB agents of the load balancers measure these other load metrics (e.g., the round-trip delay or TCP window size), while in other embodiments, the load balancers measure one or more of these load metrics (e.g., the round-trip delay or TCP window size).

The second stage 1402 shows the LB controller set 520 distributing global load statistics to the LB agents (not shown) of each of the load balancers 1400. The global load statistics in some embodiments is an aggregation of the local statistics that the load balancers provide (through the LB agent) to the LB controller set 520. The second stage 1402 shows an example of the global connection statistics, which is the global statistics 1425 that the LB agent of the load balancer 1400a receives from the LB controller set 520. As shown, the global statistics in this example show the following numbers of active connections for the five application servers 1410a-1410e: 131, 135, 101, 100, and 86. These numbers of connection represent the numbers of active flows that all five load balancers 1400 are distributing to the five application servers 1410a-1410e from the five webservers 1405.

Like the gathered local statistics, the distributed global statistics are different types of traffic and/or load metrics in other embodiments. In some embodiments, the distributed global statistics include for each DCN in the DCN group, aggregated message traffic data that expresses the data message traffic load on the DCN. Examples of such load data include the number of data messages (e.g., number of packets) received by the DCN, number of flows processed by the DCN, number of data message bytes received by the DCN, etc. In some embodiments, the metrics can be normalized to units of time, e.g., per second, per minute, etc. Also, in some embodiments, the distributed global statistics express the data message load on each DCN in terms of a relative congestion percentage that compares the load of the DCN to the load of other DCNs in the group.

In some embodiments, the distributed global statistics include an aggregated round trip delay (e.g., average round trip delay) to each DCN, an aggregated TCP window size value (e.g., average TCP window size) for each DCN, etc. Also, in some embodiments, the distributed global statistics are partially or completely based on metrics that the LB controller set 520 gathers by interacting directly with the DCNs (e.g. with the application servers 1410). In some embodiments in which the global statistics are completely based on metrics directly gathered by the LB controller set, the LB controller set does not gather statistics that the load balancers 1400 collect locally.

The second stage 1402 also shows the adjustment of the weight values that the load balancer 1400a uses to spread new flows to the application servers 1410. These weight values are adjusted by the LB agent(s) 620 based on the received global statistics 1425. The weight values after they are adjusted are 1, 1, 2, 2, 3. These weight values direct the load balancer 1400a to spread in a weighted round-robin approach the next nine new data message flows as follows: 1 to the first application server 1410*a*, 1 to the second application server 1410*b*, 2 to the third application server 1410*c*, 2 to the fourth application server 1410*d*, and 3 to the fifth application server 1410*e*. As mentioned above, some embodiments specify and use time period values in the LB rules in order to allow the load balancers to gracefully transition between different weight value sets to dynamically adjust their load balancing operations.

The third stage 1403 shows that after this adjustment of the weight values, the relative even distribution of flows by the load balancer 1400*a* becomes skewed towards the application servers 1410 that are associated with the higher weight values, i.e., the application servers 1410*c*, 1410*d*, and 1410*e*. Specifically, this stage shows that once the weight values are adjusted, the number of flows (from the webservers 1405 to the application servers 1410) goes from 20, 20, 20, 19, and 19, to 23, 23, 26, 26, and 28.

In the example illustrated in FIG. 14, the load balancing criteria (i.e., the weight values in this example) are adjusted by the LB agent(s) based on global statistics distributed by the LB controller set 520. In other embodiments, however, the LB controller set adjusts and distributes the load balancing criteria based on statistics that the LB controller set collects from the load balancers and/or from the DCN group(s). In these embodiments, the load balancers use the load balancing criteria distributed by the LB controller set to perform or adjust their load balancing operations. In some of these embodiments, the LB controller set also initially defines the LB rules with the initial weight values, and distributes these rules to the load balancers (through the LB agents) for the load balancers to store and use.

In three operational stages 1501-1503, FIG. 15 illustrates an example of adding a DCN to a DCN group to alleviate the traffic load on the DCN group members. This example follows the third stage 1403 of the example of FIG. 14. The first stage 1501 of FIG. 15 shows the addition (e.g., the allotment or instantiation) of a sixth application sever 1410*f* to the application server group 1450. This sixth application server 1410*f* has been added to the group by the LB controller set 520 directing the VM managing controller set 525 to allot a previously created application server VM to this group, or to instantiate a new application server VM for this group.

The first stage 1501 also shows the LB controller set 520 providing global statistics 1520 and group update 1522 to the LB agents (not shown) of the load balancers 1400. The global statistics 1520 show that each application server is currently handling about 50K flows, which in this example is assumed to be near the threshold maximum number of flows for each application server. As shown, in this stage, the number of flows from load balancer 1400*a* to the application servers is 20K, 18K, 21K, 17K, and 19K.

The group update 1522 informs the load balancers that the sixth application server 1410*f* has been added to the application server group 1450. In response to this group update, the LB agent (not shown) of the webserver 1405*a* adjusts the weight values of the LB rule that load balancer 1400*a* of this webserver enforces. As shown in the first stage 1501, the adjusted weight values are 1, 1, 1, 1, 1, 1000. This weight value set directs the load balancer to assign the next 1005 new data flows from the webserver 1405*a* to the application servers 1410*a*-1410*f* based on a weighted round robin scheme that assigns the next five news flows to the applications servers 1410*a*-1410*e*, and then assign the next 1000 flows to the application server 1410*f*.

After receiving the group update 1522, the LB rules of the other load balancers of the other webservers 1405 are similarly adjusted by their respective LB agent(s). In response to these adjusted weight values, the load on the sixth application servers 1410*f* starts to increase, while the load on the first five application servers 1410*a*-1410*e* starts to decrease, as shown in the second stage 1502. The second stage 1502 shows the LB controller set providing updated global statistics 1525 to the LB agents (not shown) of the load balancers 1400. The updated global statistics 1525 shows that the load on the five application servers 1410*a*-1410*e* has dropped to 40K, 39K, 41K, 38K and 39K, while the load on the sixth application server 1410*f* has risen to 18K. In this stage, the number of flows from load balancer 1400*a* to the application servers is now 14K, 12K, 13K, 15K, 16K, and 8K.

The second stage 1502 also shows that in response to the updated global statistics, the weight values for the load balancer 1400*a* have been adjusted to be 1, 1, 1, 1, 3. After receiving the global statistics 1525, the weight values of the other load balancers of the other webservers 1405 are also adjusted by their respective LB agent(s). The third stage 1503 then shows that in response to these weight value adjustments, the load across the application servers 1410 has reached 44K, 42K, 43K, 45K, 46K, and 35K, as indicated in the updated global statistics 1535. In this stage, the number of flows from load balancer 1400*a* to the application servers is now 12K, 12K, 13K, 14K, 13K, and 13K.

In three operational stages 1601-1603, FIG. 16 illustrates an example of removing a DCN from a DCN group when fewer DCNs are needed to handle the load on the DCN group. This example follows the third stage 1503 of the example of FIG. 15. The first stage 1601 of FIG. 16 shows the LB controller set 520 providing global statistics 1620 and group update 1622 to the LB agents (not shown) of the load balancers 1400. The global statistics 1620 show that the application servers 1410 respectively handling 22K, 26K, 27K, 28K, 28K, and 26K flows. As shown, in this stage, the number of flows from load balancer 1400*a* to the application servers is 6K, 7K, 10K, 9K, 10K and 10K.

The first stage 1601 also shows the LB controller set 520 providing a group update 1622 that informs the load balancers that the first application server 1410*a* should be removed from the application server group 1450. In response to this group update, the LB agent (not shown) of the webserver 1405*a* adjusts the weight values of the LB rule that load balancer 1400*a* of this webserver enforces. As shown in the first stage 1601, the adjusted weight values are 0, 2, 1, 1, 1, 1. This weight value set directs the load balancer to assign the next 6 new data flows from the webserver 1405*a* to the application servers 1410*b*-1410*f* based on a weighted round robin scheme that assigns the next two news flows to the applications server 1410*b*, and then assign the next four flows individually to each of the four application servers 1410*c*-1410*f*.

After receiving the group update 1622, the LB rules of the other load balancers of the other webservers 1405 are similarly adjusted by their respective LB agent(s). In response to these adjusted weight values, the load on the first application server 1410*a* starts to decrease, while the load on the other five application servers 1410*b*-1410*f* starts to increase, as shown in the second stage 1602. The second stage 1602 shows the LB controller set providing updated global statistics 1625 to the LB agents (not shown) of the load balancers 1400. The updated global statistics 1625 shows that the load on the application server 1410*a* has dropped down to 12K flows, while the load on the application servers 1410b-1410f has increased to 30K, 32K, 31K, 32K and 30K flows. In this example, the load on the application server 1410a does not immediately fall to zero because this server continues to receive data messages for flows that it has been processing.

The second stage also shows the number of flows from load balancer 1400a to the application servers to now be 5K, 8K, 9K, 8K, 10K, and 9K. The second stage 1602 further shows that in response to the updated global statistics, the weight values for the load balancer 1400a have been adjusted to be 0, 1, 1, 1, 1, 1. After receiving the global statistics 1625, the weight values of the other load balancers of the other webservers 1405 are also adjusted by their respective LB agent(s).

The third stage 1603 then shows that in response to these weight value adjustments, the application server 1410a has effectively been removed from the DCN group 1450 as it no longer receives any flows from the load balancers 1400. This stage also shows that the load on the other application servers 1410b-f has reached 40K, 39K, 41K, 38K and 39K flows, as indicated in the updated global statistics 1635. In this stage, the number of flows from load balancer 1400a to the application servers is now 0, 12K, 13K, 14K, 13K, and 13K.

Examples above show the addition of new DCNs to alleviate the traffic load. In some embodiments, the load on the DCNs can be adjusted by adding or removing SCN VMs. Also, even though the LB rules in the above-described examples include weight values that facilitate the load balancers dynamic adjustment of the load, one of ordinary skill in the art will realize that in other embodiments the load balancers use other mechanisms for dynamically adjusting the data traffic load based on dynamically detected load conditions.

In the above-described examples, the load balancers are described as balancing the data traffic between different layers of data compute end nodes (DCENs), such as webservers, application servers and database servers. However, in some embodiments, the distributed load balancing architecture can be used to load balance the data traffic to and from middlebox service nodes. In other words, the DCNs in the DCN group in some embodiments can be middlebox service nodes (such as firewalls, intrusion detectors, WAN optimizers, etc.).

Figure 17:
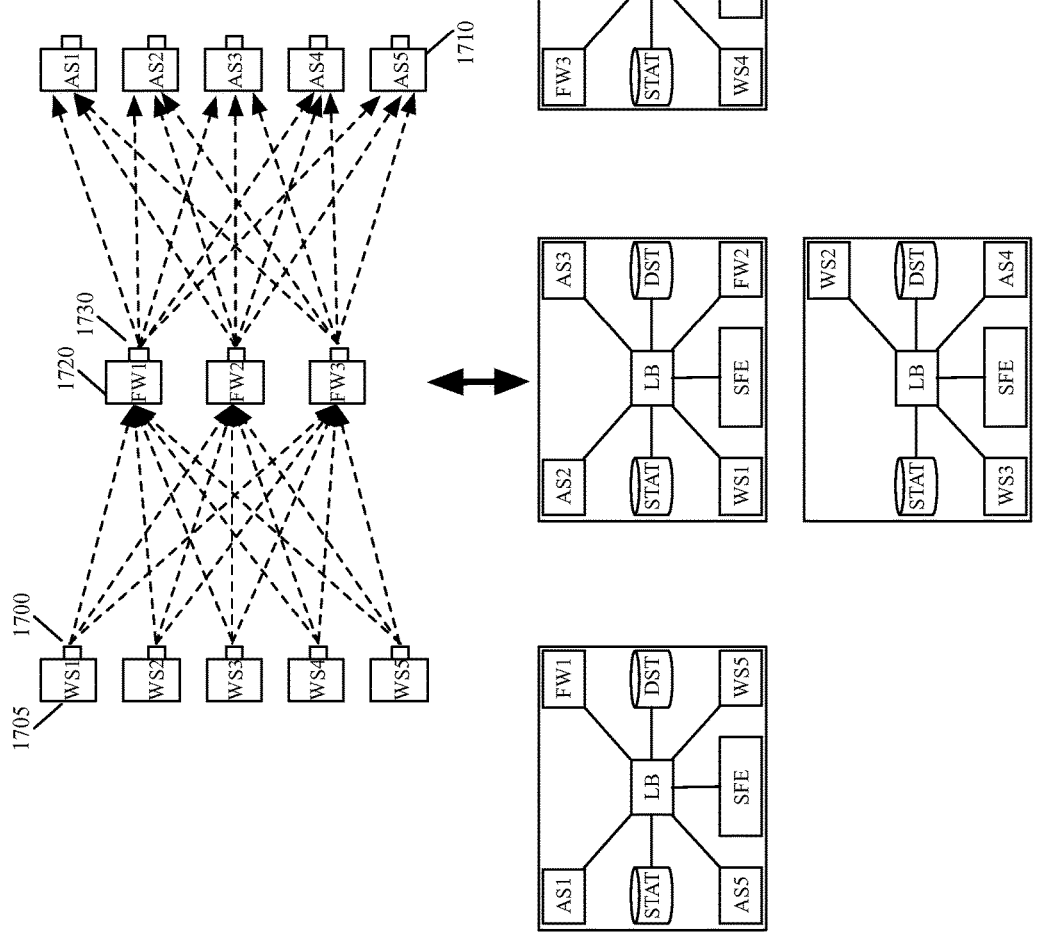
FIG. 17 illustrates that the distributed load balancing architecture of some embodiments can be used to load balance the data traffic to and from middleboxes.

Also, as illustrated in FIG. 17, the inline load balancers in some embodiments can be configured to route data messages that are sent to DCENs initially to a set of middlebox service nodes. In this example, inline load balancers 1700 (associated with the webserver VMs 1705) direct the data traffic that web servers 1705 send to application servers 1710, to firewall middlebox VMs 1720. In directing the data messages to the firewalls 1720, the inline load balancers perform load balancing operations that spread the data message load among the firewalls 1720. Once processed by the firewalls 1720, the firewall-filtered data messages are distributed by the inline load balancers 1730 (associated with the firewall VMs 1720) to the application servers 1710. As shown, in this example, the firewall servers are service VMs executing on the same hosts as the webservers and application servers.

To direct to the firewall VMs the data traffic that is addressed to the application servers' virtual address (e.g., VIP), the load balancers 1700 in some embodiments (1) perform a virtual address (e.g., a VIP) translation that replaces the application server virtual address with the firewall VM's virtual address, and then (2) spread the received data traffic amongst the firewall VMs based on their load balancing criteria. In some embodiments, the load balancers 1700 address translation inserts identifiers in the message identifiers (e.g., in the packet header) that allows the firewall VMs 1720 and load balancers 1730 to determine that their received messages are directed to application servers 1710. To make this determination, the load balancers 1730 are configured with rules that enable the load balancers to associate the received data messages with the application servers 1710 in some embodiments.

As mentioned above, an inline load balancer 615 of a VM 605 can perform multiple different load balancing operations for multiple different groups of DCNs. This is because the load balancer 615 can apply the load balancing rules of multiple different groups of DCNs. These rules are stored in the load balancing data storage 440, as described above by reference to FIGS. 6-8.

Figure 18:
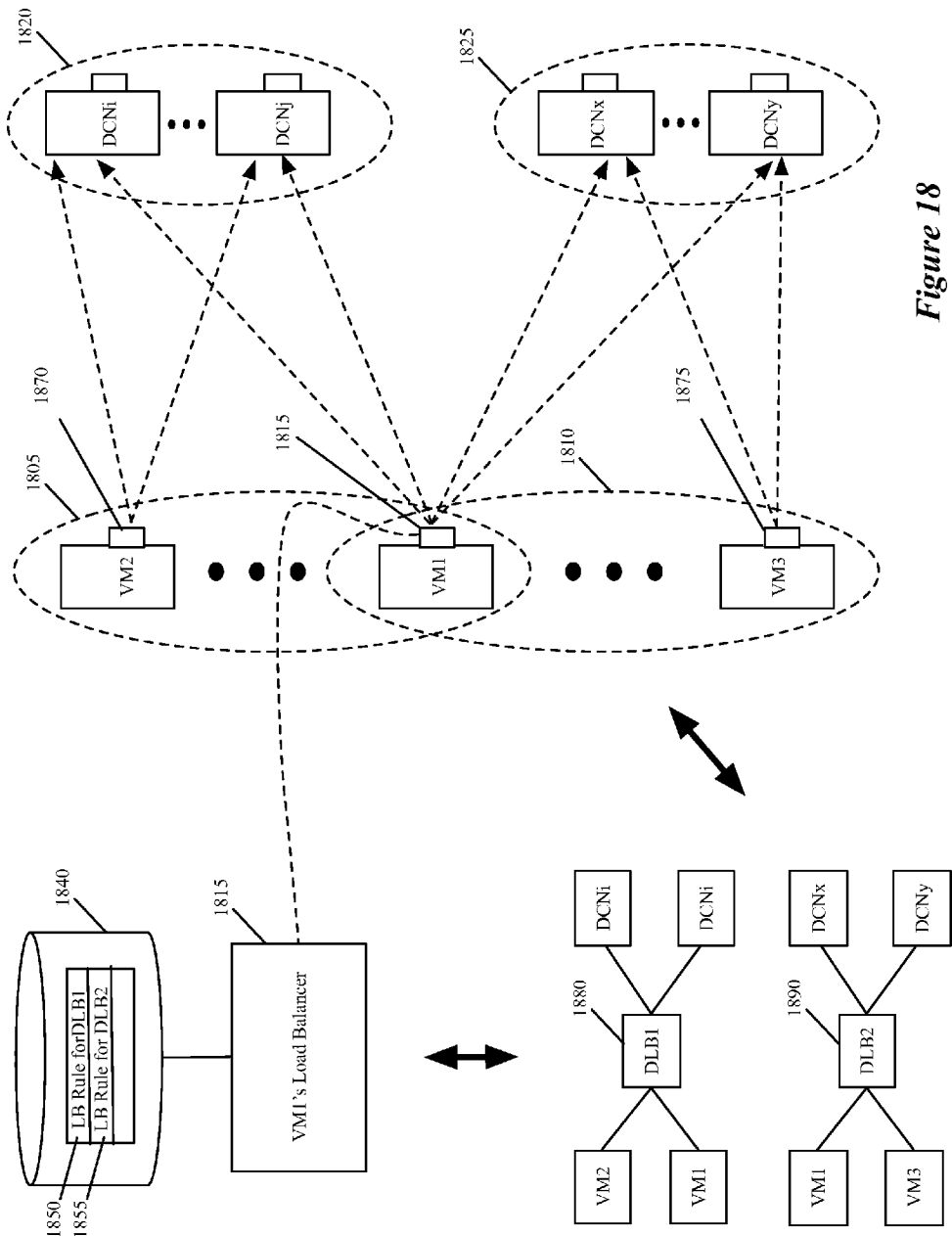
FIG. 18 presents an example that illustrates one VM's inline load balancer forming multiple distributed load balancers with multiple other inline load balancers of other VMs.

FIG. 18 illustrates that one inline load balancer can form multiple different distributed load balancers with multiple different sets of inline load balancers. FIG. 18 presents two sets of inline load balancers that distribute the data messages of two different sets 1805 and 1810 of VMs to two different groups of DCNs 1820 and 1825. One VM, VM1, is part of both sets 1805 and 1810 of VMs. Each inline load balancer is analogous to the inline load balancer 615 of FIG. 6.

As shown in FIG. 18, the inline load balancer 1815 of VM1 enforces load balancing rules 1850 and 1855 that are stored in its load balancing storage 1840. These load balancing rule 1850 and 1855 direct the load balancer 1815 to distribute data messages of VM1 that are directed respectively to DCN groups 1820 and 1825 to the DCNs in these groups. Also, in this example, the inline load balancer 1870 of the virtual machine VM2 enforces a LB rule for distributing data messages for DCN group 1820, while the inline load balancer 1875 of the virtual machine VM3 enforces a LB rule for distributing data messages for DCN group 1825. The LB rules of the inline load balancers 1815 and 1870 of VM1 and VM2 for DCN group 1820 can have identical LB criteria or different LB criteria. Similarly, the LB rules of the inline load balancers 1815 and 1870 of VM1 and VM3 for DCN group 1825 can have identical LB criteria or different LB criteria. These load balancing rules (e.g., rules 1850 and 1855) and their associated load balancing storage (e.g., storage 1840) are analogous to the load balancing rules 700 and 800 and the load balancing storage 440 of FIGS. 6-8.

As shown in FIG. 18, the inline load balancers (e.g., 1815 and 1870 of VM1 and VM2) of VM group 1805 form a distributed load balancer 1880 that distributes the data messages from VMs of group 1805 amongst the DCNs of DCN group 1820. Similarly, as shown, the inline load balancers (e.g., 1815 and 1875 of VM1 and VM3) of VM group 1810 form a distributed load balancer 1890 that distributes the data messages from VMs of group 1810 amongst the DCNs of DCN group 1825.

Each distributed load balancer 1880 or 1890 is logical construct as it is not one item in the physical world, but rather conceptually represents one set of load balancing operations that a group of associated inline load balancers performs to distribute the data message load on a DCN group. In this distributed approach, each inline load balancer only needs to store the load balancing rules of the distributed load balancer that it implements. In other words, each inline load balancer in this distributed approach only needs to store the load balancing rules of the DCN-group data messages that its associated VM might send out. Also, in this distributed approach, each inline load balancer needs to only maintain in its connection data store (e.g., connection data storage 690) the flow connection states of the data message flows sent by the load balancer's associated VM. Because of all of these reasons, the inline load balancers of some embodiments are fast and efficient as they maintain small LB rule and connection state data storages that they can search quickly.

In the example illustrated in FIG. 18, the inline load balancer 1815 is shown to be part of two distributed load balancers 1880 and 1890 by being part of two sets of associated load balancers, one for the VM group 1805 and another for the VM group 1810. In other examples, an inline load balancer can be part of any arbitrary number N of distributed load balancers, when with another set of N inline load balancers it enforces N load balancing rules for data messages that are being directed to N different DCN groups.

Figure 19:
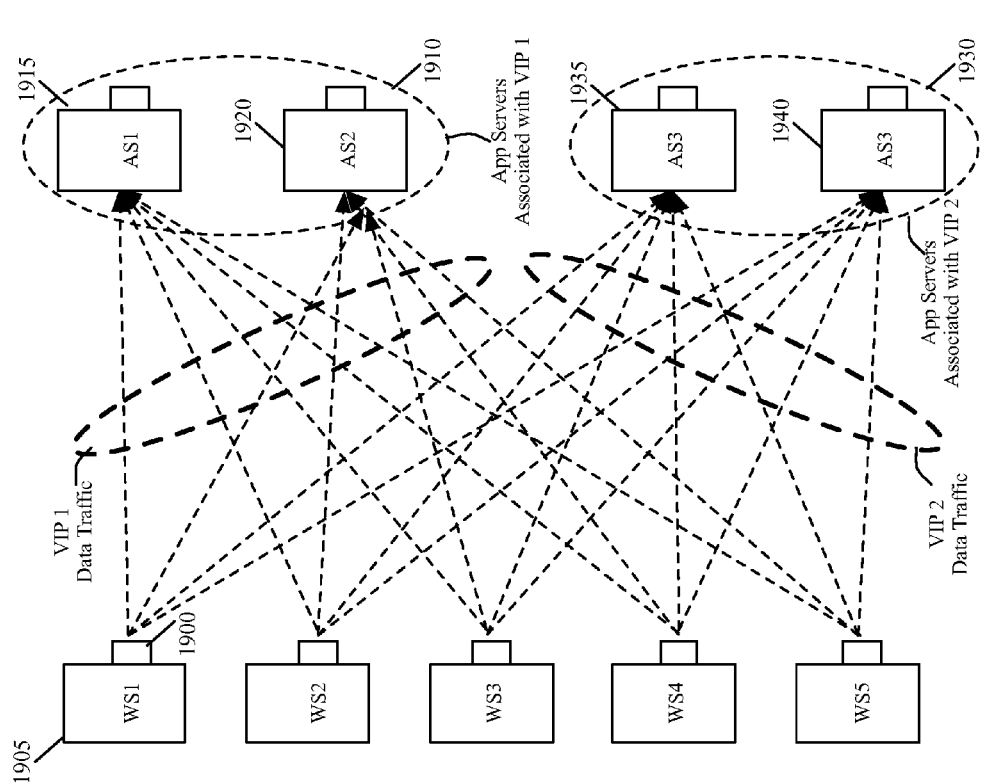
FIG. 19 presents an example to illustrate that the distributed load balancers of some embodiments can differently translate the virtual addresses of data messages to different groups of DCNs.

FIG. 19 illustrates another example that illustrates that the inline load balancers of some embodiments can differently translate the virtual addresses of data messages to different groups of DCNs. Specifically, this figure illustrates five inline load balancers 1900 of five webservers 1905 that direct and load balance data messages to a first VIP associated with a first group 1910 of application servers to the application servers 1915 and 1920 of this group 1910, while directing and load balancing data messages to a second VIP associated with a second group 1930 of application servers to the application servers 1935 and 1940 of this group 1930.

Figure 20:
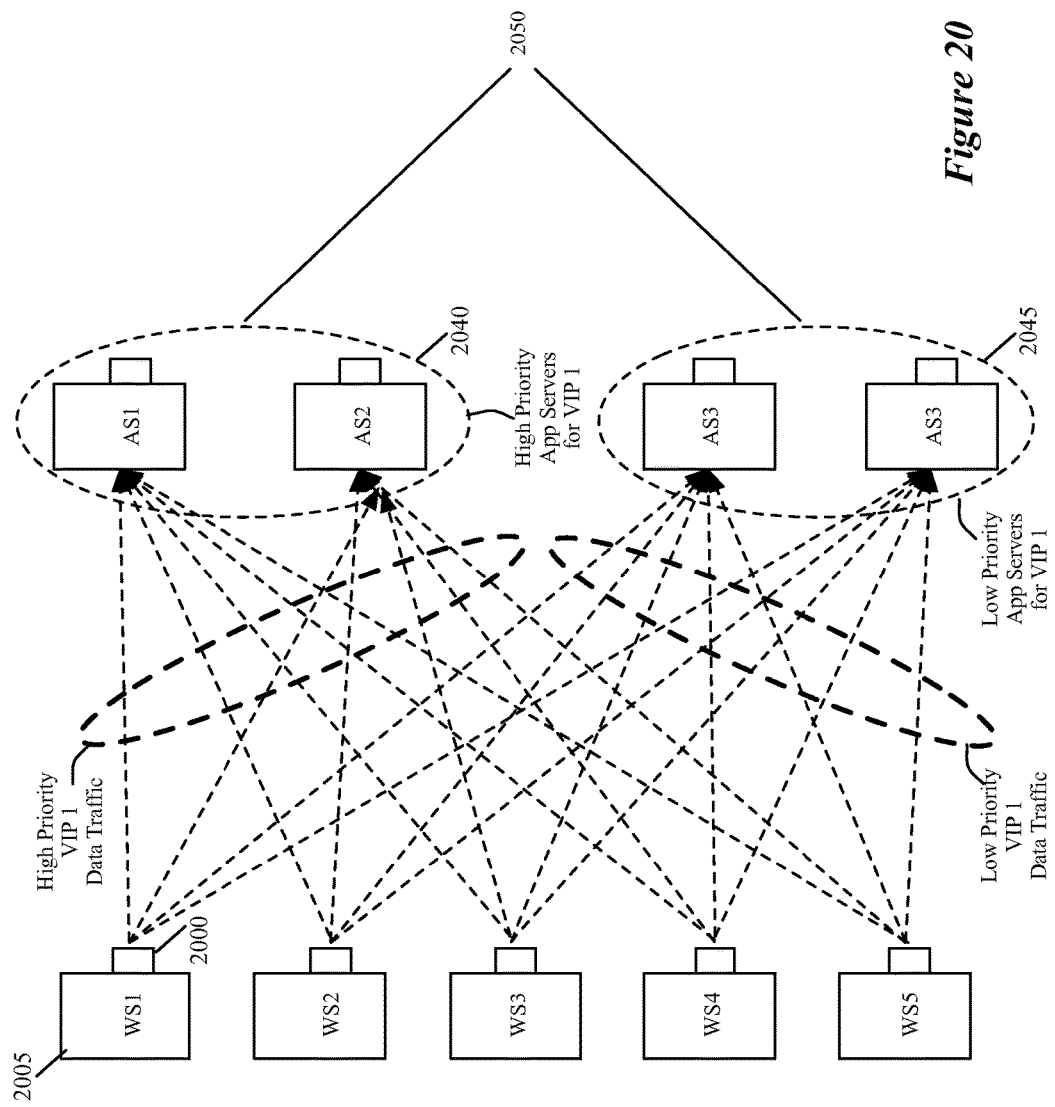
FIG. 20 illustrates a set of distributed load balancers that direct webserver data messages to a group of application servers to either a high-priority sub-group of application servers or a low priority group of application servers based on the assessed priority of the data messages.

In some embodiments, the inline load balancers differently direct and load balance data messages that are addressed to the same virtual address. For instance, some embodiments define priority sub-groups within an addressed DCN group, and load balance different priority data messages to different sub-groups based on their priority. For example, FIG. 20 illustrates a set of inline load balancers 2000 that direct webserver data messages to a group 2050 of application servers to either a high-priority sub-group 2040 of application servers or a low priority group 2045 of application servers based on the assessed priority of the data messages.

In different embodiments, the load balancers 2000 assess the priority of the data messages from the webservers 2005 differently. For instance, in some embodiments, the load balancers assess the priority of the data messages based on identity of the sources from which the webserver received the data messages. After assessing the priority of the data messages, the load balancers direct the received data messages to the application server sub-group with the corresponding priority.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 21:
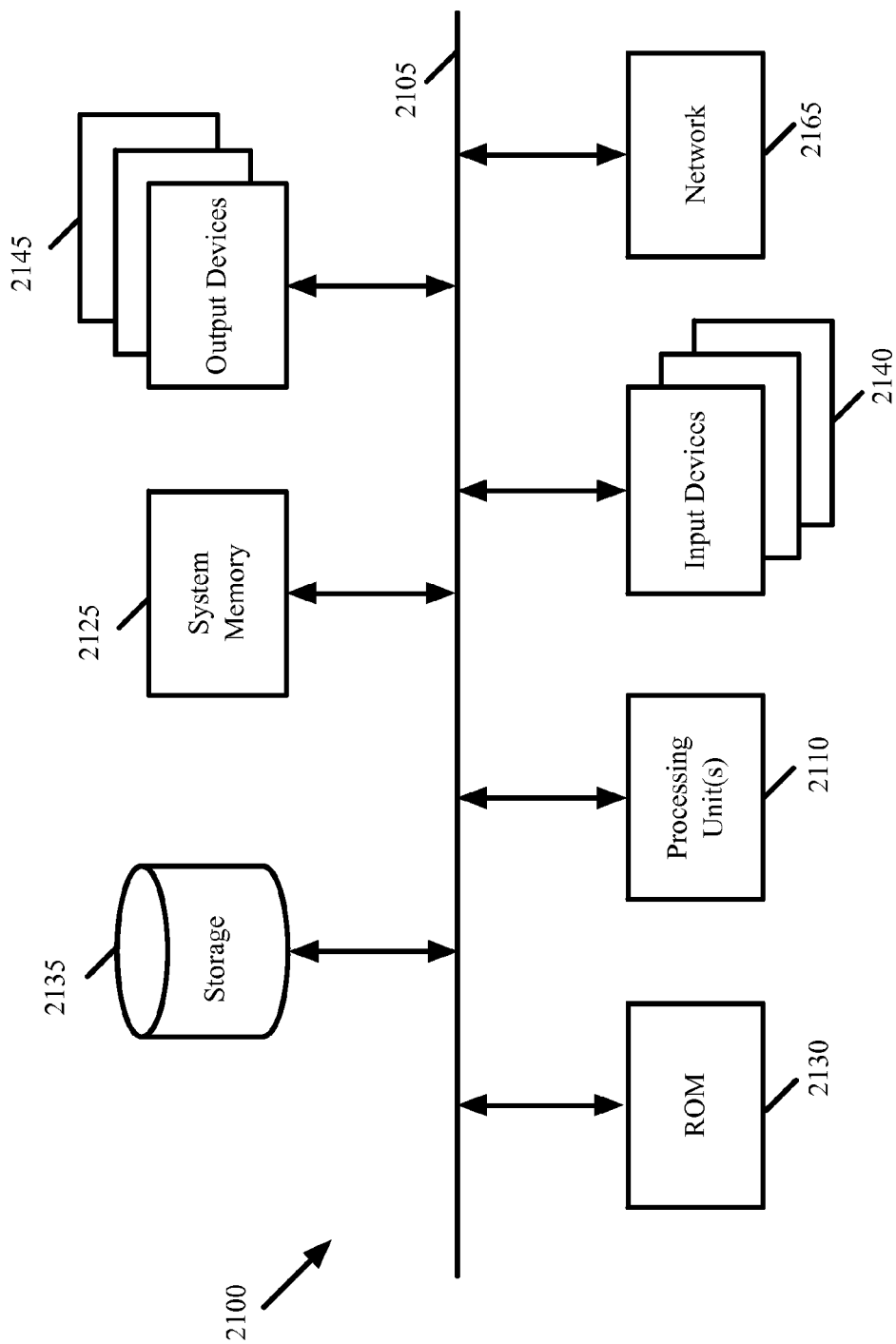
FIG. 21 conceptually illustrates a computer system with which some embodiments of the invention are implemented.

FIG. 21 conceptually illustrates a computer system 2100 with which some embodiments of the invention are implemented. The computer system 2100 can be used to implement any of the above-described hosts, controllers, and managers. As such, it can be used to execute any of the above described processes. This computer system includes various types of non-transitory machine readable media and interfaces for various other types of machine readable media. Computer system 2100 includes a bus 2105, processing unit(s) 2110, a system memory 2125, a read-only memory 2130, a permanent storage device 2135, input devices 2140, and output devices 2145.

The bus 2105 collectively represents all system, peripheral, and chipset buses that communicatively connect the numerous internal devices of the computer system 2100. For instance, the bus 2105 communicatively connects the processing unit(s) 2110 with the read-only memory 2130, the system memory 2125, and the permanent storage device 2135.

From these various memory units, the processing unit(s) 2110 retrieve instructions to execute and data to process in order to execute the processes of the invention. The processing unit(s) may be a single processor or a multi-core processor in different embodiments. The read-only-memory (ROM) 2130 stores static data and instructions that are needed by the processing unit(s) 2110 and other modules of the computer system. The permanent storage device 2135, on the other hand, is a read-and-write memory device. This device is a non-volatile memory unit that stores instructions and data even when the computer system 2100 is off. Some embodiments of the invention use a mass-storage device (such as a magnetic or optical disk and its corresponding disk drive) as the permanent storage device 2135.

Other embodiments use a removable storage device (such as a floppy disk, flash drive, etc.) as the permanent storage device. Like the permanent storage device 2135, the system memory 2125 is a read-and-write memory device. However, unlike storage device 2135, the system memory is a volatile read-and-write memory, such a random access memory. The system memory stores some of the instructions and data that the processor needs at runtime. In some embodiments, the invention's processes are stored in the system memory 2125, the permanent storage device 2135, and/or the read-only memory 2130. From these various memory units, the processing unit(s) 2110 retrieve instructions to execute and data to process in order to execute the processes of some embodiments.

The bus 2105 also connects to the input and output devices 2140 and 2145. The input devices enable the user to communicate information and select commands to the computer system. The input devices 2140 include alphanumeric keyboards and pointing devices (also called "cursor control devices"). The output devices 2145 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 21, bus 2105 also couples computer system 2100 to a network 2165 through a network adapter (not shown). In this manner, the computer can be a part of a network of computers (such as a local area network ("LAN"), a wide area network ("WAN"), or an Intranet, or a network of networks, such as the Internet. Any or all components of computer system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, while the load balancing processes were described above by reference to several host architecture, one of ordinary skill in the art will realize that these processes could be implemented in a variety of different architectures that load balance messages at variety of different locations along their egress path out of the host. For instance, in some embodiments, the load balancing processes are implemented in the PNIC of the host. In other words, the PNIC of the host in some embodiments examines the VM messages to determine whether it should load balance them before sending them out of the host or sending them to their destination GVMs.

In many of the above-described examples, the virtual addresses are VIPs, which the load balancers replace by physical IP addresses of the DCN VMs. However, one of ordinary skill in the art will realize that, in other embodiments, the virtual addresses are different types of addresses and the load balancers perform other address translation operations. For example, in some embodiments, the load balancer translates a virtual port address to a physical port address (i.e., performs L4 address translation operations), instead of or in conjunction with performing the IP network address translation (to replace the VIP with a physical IP address). In still other embodiments, the load balancer directs a data message to a DCN in a DCN group through MAC redirection operation, which replaced one MAC address with the MAC address of the DCN that should received the data messages. In some embodiments, the DCNs are connected to one distributed logical switch that logically spans multiple hosts, and the MAC redirection directs a data message that is addressed to one port of the logical switch to another port of the logical switch.

In many of the above-described examples, an LB agent adjusts the load balancing criteria for the load balancers that execute on its host based on the data distributed by the controller set. One of ordinary skill will realize that in other embodiments, the load balancers themselves adjust their load balancing criteria based on the data distributed by the controller set.

This specification refers throughout to computational and network environments that include virtual machines (VMs). However, virtual machines are merely one example of a compute node, also referred to as addressable nodes. Some embodiments of the invention are equally applicable to any computing node that utilizes a port abstraction defined on a host computing device to allow multiple programs that execute on the host to share common resources on the host. As such, the compute nodes in some embodiments may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

A number of the figures (e.g., FIGS. 9-13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. In view of the foregoing, one of ordinary skill in the art would understand that the invention is not to be limited by the foregoing illustrative details, but rather is to be defined by the appended claims.

We claim:

1. A non-transitory machine readable medium storing sets of instructions for performing load balancing operations on a particular host computer on which at least one particular source compute node (SCN) executes, the sets of instructions comprising instructions for:
    based on a set of load balancing criteria, distributing data messages sent by the particular SCN among the destination compute nodes (DCNs) of a DCN group,
    sending, to a set of controllers, message traffic statistics relating to data messages that are distributed among the DCNs of the DCN group;
    receiving, from the set of controllers, data that identifies at least one DCN that has been removed from the DCN group;
    receiving, from the set of controllers, a set of adjusted load balancing criteria that the set of controllers calculates by (1) collecting message traffic statistics from a plurality of host computers performing load balancing operations for data messages sent by SCNs executing on the host computers, (2) aggregating the collected message traffic statistics, and (3) computing the adjusted load balancing criteria from the aggregated collected message traffic statistics;
    based on the received set of adjusted load balancing criteria, adjusting the distribution of the data message flows from the particular SCN among the DCNs of the DCN group; and
    directing, after receiving the updated membership data, all new data message flows to a subset of DCNs in the DCN group that does not include the removed DCN.

2. The non-transitory machine readable medium of claim 1, wherein the aggregated message traffic statistics expresses the data message traffic load on each DCN in the DCN group.

3. The non-transitory machine readable medium of claim 1, wherein the aggregated message traffic statistics expresses either the number of flows, packets or bytes directed to each DCN.

4. The non-transitory machine readable medium of claim 1, wherein the aggregated message traffic statistics expresses a relative congestion percentage of each DCN.

5. The non-transitory machine readable medium of claim 1 further comprising a set of instructions for receiving at the particular host computer an initial set of load balancing criteria as part of an initial configuration for the load balancing operations.

6. The non-transitory machine readable medium of claim 5, wherein the load balancing criteria specifies numerical values that affect how the data messages are distributed among the DCNs.

7. The non-transitory machine readable medium of claim 6, wherein the numerical values include one weight value for each DCN, wherein the set of instructions for distributing the data messages comprises a set of instructions for performing based on the weight values, a weighted round robin selection of the DCNs for new data message flows.

8. The non-transitory machine readable medium of claim 1, wherein the received load balancing criteria set specifies a weight value for each DCN.

9. The non-transitory machine readable medium of claim 1, the sets of instructions further comprising sets of instructions for:
    receiving data that identifies at least one new DCN that has been added to the DCN group; and
    directing a portion of new data message flows to the newly added DCN.

10. The non-transitory machine readable medium of claim 1, wherein the removed DCN is a DCN that has been removed from the DCN group due to an operational failure at the DCN, and
    the sets of instructions further comprises a set of instructions for redirecting message data flows that were previously being directed to the removed DCN to other DCNs in the group.

11. The non-transitory machine readable medium of claim 1, the sets of instructions further comprising sets of instructions for:
    intercepting each data message from the SCN,
    determining whether the data message is addressed to the DCN group, and
    directing the data message to one of the DCNs in the DCN group when the data message is addressed to the DCN group.

12. The non-transitory machine readable medium of claim 11, wherein the set of instructions for directing the data message comprises a set of instructions for directing at least two different data messages that are part of two different data message flows to two different DCNs of the DCN group.

13. The non-transitory machine readable medium of claim 11, wherein the set of instructions for directing the data message comprises a set of instructions for supplying the data message to a software forwarding element (SFE) that executes on the load balancer's host computing device, for the SFE to forward the data message to an addressed destination.

14. A method for performing load balancing operations on a particular host computer on which at least one particular source compute node (SCN) executes, the method comprising:
    based on a set of load balancing criteria, distributing data messages sent by the particular SCN among the destination compute nodes (DCNs) of a DCN group,
    sending, to a set of controllers, message traffic statistics relating to data messages that are distributed among the DCNs of the DCN group;
    from the set of controllers, receiving a set of adjusted load balancing criteria that the set of controllers calculates by (1) collecting message traffic statistics from a plurality of host computers performing load balancing operations for data messages sent by SCNs executing on the host computers, (2) aggregating the collected message traffic statistics, and (3) computing the adjusted load balancing criteria from the aggregated collected message traffic statistics; and
    from the set of controllers, receiving data that identifies at least one DCN that has been removed from the DCN group;
    based on the received set of adjusted load balancing criteria, adjusting the distribution of the data message flows from the particular SCN among the DCNs of the DCN group; and directing, after receiving the updated membership data, all new data message flows to a subset of DCNs in the DCN group that does not include the removed DCN.

15. The method of claim 14, wherein the aggregated message traffic statistics expresses the data message traffic load on each DCN in the DCN group.

* * * * *